US006630641B2

(12) United States Patent
Tamida et al.

(10) Patent No.: US 6,630,641 B2
(45) Date of Patent: Oct. 7, 2003

(54) ELECTRIC DISCHARGE MACHINING APPARATUS GENERATING PRELIMINARY DISCHARGE AND MACHINING DISCHARGE PULSES

(75) Inventors: Taichiro Tamida, Tokyo (JP); Takashi Hashimoto, Tokyo (JP); Akihiro Suzuki, Tokyo (JP); Akihiko Iwata, Tokyo (JP); Atsushi Taneda, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/848,344

(22) Filed: May 4, 2001

(65) Prior Publication Data

US 2002/0060205 A1 May 23, 2002

(30) Foreign Application Priority Data

Nov. 21, 2000 (JP) ......................... 2000-354666

(51) Int. Cl.[7] .............................. B23H 1/02; B23H 7/14
(52) U.S. Cl. .................................. 219/69.18; 219/69.13
(58) Field of Search ........................... 219/69.13, 69.18

(56) References Cited

U.S. PATENT DOCUMENTS

| | | | | | |
|---|---|---|---|---|---|
| 3,604,885 | A | * | 9/1971 | Inoue | 219/69.18 |
| 3,825,715 | A | * | 7/1974 | Saito et al. | 219/69.13 |
| 4,892,989 | A | * | 1/1990 | Itoh | 219/69.13 |
| 5,118,915 | A | * | 6/1992 | Magara | 219/69.13 |
| 5,986,232 | A | * | 11/1999 | Kaneko et al. | 219/69.18 |
| 2002/0092832 | A1 | * | 7/2002 | Hashimoto et al. | 219/69.13 |

FOREIGN PATENT DOCUMENTS

| | | | |
|---|---|---|---|
| JP | 56-134131 A | * | 10/1981 |
| JP | 60-123218 | | 7/1985 |
| JP | 8-108320 | | 4/1996 |

OTHER PUBLICATIONS

Saito et al., "Technique For Discharge Machining", Nikkan Kougyo Shinbunsya, Sep. 30, 1997.

* cited by examiner

*Primary Examiner*—Geoffrey S. Evans
(74) *Attorney, Agent, or Firm*—Leydig, Voit & Mayer, Ltd.

(57) ABSTRACT

An electric discharge machining apparatus includes a wire electrode for machining a workpiece, and a first voltage applying unit for applying a voltage pulse. The voltage pulse has a rise time longer than a discharge formative time lag when a rectangular voltage pulse is applied, when a distance between the workpiece and the wire is an average value in machining, and rises to the same voltage as the rectangular voltage pulse.

17 Claims, 30 Drawing Sheets

ELECTRIC DISCHARGE MACHINING APPARATUS GENERATING PRELIMINARY DISCHARGE AND MACHINING DISCHARGE PULSES

FIELD OF THE INVENTION

The present invention in general relates to an electric discharge machining apparatus that generates an electric discharge between a workpiece and an electrode so as to carry out machining with respect to the workpiece. More particularly, this invention relates to an electric discharge machining apparatus which can perform machining at high speed.

BACKGROUND OF THE INVENTION

As a conventional electric discharge machining apparatus, there have been known a wire electric discharge machine carrying out wire electric discharge machining and a die sinking electric discharge machine carrying out die sinking electric discharge machining. In wire electric discharge machining, a conductive wire is used as an electrode so as to carry out machining; on the other hand, in die sinking electric discharge machining, an electrode having various shapes is used so as to carry out machining. FIG. 23 is a view schematically showing a construction of a conventional wire electric discharge machine.

The conventional wire electric discharge machine includes: a conductive wire 51 used as an electrode; a voltage applying circuit 53 for applying a rectangular voltage pulse between the wire 51 and a workpiece 52; a feeder cable 54a for connecting the workpiece 52 and the voltage applying circuit 53; a feeder cable 54b for connecting the wire 51 and the voltage applying circuit 53, and a feeder terminal 55. Further, the conventional wire electric discharge machine includes: a feed reel 56 for feeding the wire 51 to the workpiece 52 side; a winding reel 57 for winding up the fed wire 51; a brake 58 for stopping feed and winding of the wire 51; a winding roller 59 for feeding the wire 51 to the winding reel 57; a cross table 60 for fixing the workpiece 52, and an X-axis motor 61 for moving the cross table 60 to a predetermined X-axis direction.

Moreover, the conventional wire electric discharge machine includes: a Y-axis motor 62 for moving the cross table 60 to a Y-axis direction perpendicular to the X-axis direction; a servo circuit 64 for driving the X-axis motor 61 and the Y-axis motor 62 via motor control cables 63a and 63b; a control circuit 65, which outputs a control signal to the servo circuit 64, and moves the cross table 60 and the workpiece 52 so as to control a machining position. Further, the conventional wire electric discharge machine includes: a working fluid tank 66, which is filled with a working fluid; a pump 67 for pumping a working fluid out of the working fluid tank 66; a working fluid supply pipe 68a for supplying a working fluid from the working fluid tank 66 to the pump 67; a working fluid supply pipe 68b for supplying a working fluid from the pump 67 to the workpiece 52 side, and a guide 69 for feeding the wire 51 to the workpiece 52 side.

In the conventional wire electric discharge machine, the voltage applying circuit 53 applies a rectangular voltage pulse between the wire 51 and the workpiece 52 via the feeder cables 54a and 54b and the feeder terminal 55. By doing so, an electric discharge occurs between the wire 51 and the workpiece 52, and a part of the workpiece 52 is removed by this electric discharge. Subsequently, the workpiece 52 is moved so as to remove a desired portion of the workpiece 52, and thereby, the workpiece is formed into a desired shape. In this case, by the electric discharge, a part of the workpiece 52 is removed while the surface of the wire 51 is being removed. For this reason, when the same portion of the wire 51 is continuously used, the wire 51 wears out. In order to prevent a breakdown of the wire, in the wire electric discharge machine, a portion of the wire 51, where no electric discharge is applied, is fed to the workpiece 52 in succession, and then, machining is carried out while the portion, where electric discharge has been already applied, is wound up in succession.

The feeding of the wire 51 is carried out by the feed reel 56 via the brake 58 and the guide 69; on the other hand, the winding of the wire 51 is carried out by the winding reel 57 via the winding roller 59. The cross table 60 is used to fix the workpiece 52. The X-axis motor 61 and the Y-axis motor 62 two-dimensionally move the cross table 60. An NC device comprising the control circuit 65 and the servo circuit 64 drives the X-axis motor 61 and the Y-axis motor 62 so that the cross table 60 and the workpiece 52 are moved so that machining position is controlled. The working fluid tank 66 is filled with de-ionized water as a working fluid. The pump 67 pumps up a working fluid of the working fluid tank 66 via the working fluid supply pipe 68a, and then, supplies the working fluid to a discharge field via the working fluid supply pipe 68b.

FIG. 24 is a view showing a configuration of the voltage applying circuit 53 shown in FIG. 23. The voltage applying circuit 53 includes a resistor 74, a switch SW51, a direct current constant voltage source 75, and a switch SW52. More specifically, the resistor 74 has one end connected to the wire 51 via the voltage applying circuit and an inductance 73 included in a current path, and one end of the switch SW51 is connected to the other end of the resistor 74. The direct current constant voltage source 75 is constructed in a manner of connecting the other end of the switch SW51 to a high voltage side, and connecting the workpiece 52 to a low voltage side. The switch SW52 is interposed between the other end of the resistor 74 and the workpiece 52. The direct current constant voltage source 75 generates a predetermined voltage. The resistor 74 is additionally provided for limiting a discharge current. The switch SW51 is a switch for increasing a voltage between the wire 51 and the workpiece 52 (hereinafter, referred simply to as interelectrode); on the other hand, the switch SW52 is a switch for setting a voltage of the inter-electrode to 0V. For example, a field effect transistor (FET) is used as each of these switches.

FIG. 25 is a view showing an operation of a conventional voltage applying circuit 53. In the operation of the voltage applying circuit 53, first, the circuit operation is changed from a state in which the switch SW51 is turned off and the switch SW52 is turned on to a state in which the switch SW51 is turned on and the switch SW52 is turned off. At this time, a voltage rises between the resistor 74 side P51 of the switch SW52 and the workpiece side P52 of the switch SW52, and thus, an interelectrode voltage rises. An interelectrode static capacitance and a value of the inductance 73 are considerably small as compared with the resistor 74; therefore, when the switch SW51 is turned on, an interelectrode voltage rises at a extremely high speed.

After a discharge time lag td (described later) elapsed, an interelectrode discharge starts in the middle of voltage pulse application, and then, a discharge current flows through the interelectrode, and thereby, an interelectrode voltage decreases. Thereafter, when the switch SW51 is turned off and the switch SW52 is turned on, the voltage between P51 and P52 and the interelectrode voltage become 0V, and then, discharge is stopped; as a result, a discharge current becomes 0 ampere. The voltage applying circuit 53 repeats the above operation at a predetermined period, and thereby, intermittently generates a discharge in the interelectrode.

FIG. 26 is a graph showing a relation between a discharge time lag and a discharge probability in a conventional electric discharge machining apparatus. As shown in FIG. 26, a discharge time lag td until a discharge current starts to flow more than a predetermined value after the interelectrode voltage exceeds 10% of the maximum value, means the following time. More specifically, the discharge time lag td is a time adding the minimum formative time lag tf required for starting a discharge and a probability time lag ts that stochastically varies in its length for each discharge together. Namely, even if an interelectrode distance (hereinafter, referred to as gap interval) and physical conditions such as voltage applied to the interelectrode are the same, the discharge time lag td for each discharge is not kept at a constant value, and varies in a predetermined range.

FIG. 27 is a graph showing a relation between a discharge time lag, a discharge probability and a gap interval in the conventional electric discharge machining apparatus. FIG. 27 shows a discharge time lag td when a voltage applied to the interelectrode is fixed to 80 volts, and a gap interval is set to each of 5 µm, 8 µm and 10 µm. As shown in FIG. 27, when the voltage applied to the interelectrode is kept constant and the gap interval is changed, when the gap interval becomes wider, a probability that the discharge time lag td becomes longer, becomes high, and then, time-out comes; as a result, sometimes no discharge occurs. On the other hand, when the gap interval becomes smaller, a probability that the discharge time lag td becomes shorter becomes high.

The gap interval is not always kept constant, and its value varies after and before average by a vibration of the wire 51 and unevenness of the workpiece 52. Therefore, when the gap interval is made too small, the wire 51 and the workpiece 52 short-circuit by variation of the gap interval; as a result, sometimes no discharge occurs. Moreover, when the wire 51 and the workpiece 52 short-circuit, sometimes the wire 51 wears out. Thus, the gap interval is securely kept to a predetermined value or more so that no problems as described above arises. In addition, when the gap interval is made small so as to make high interelectrode field strength, this increases a probability that a discharge is continuously made at the same portion; a so-called concentrated discharge occurs.

FIG. 28 is a graph showing a relation between a discharge time lag, a discharge probability and an applied voltage in the conventional electric discharge machining apparatus. FIG. 28 shows a discharge time lag td when a gap interval is fixed to 5 µm, and a voltage applied to the interelectrode is set to each of 80V and 100V. A shown in FIG. 28, when the gap interval is kept constant and a voltage applied to the interelectrode is changed, when the voltage applied to the interelectrode becomes lower, a probability that the discharge time lag td becomes longer, becomes high. Then, time-out comes; as a result, sometimes no discharge occurs. On the other hand, when the voltage applied to the interelectrode becomes higher, a probability that the discharge time lag td becomes shorter becomes high. Moreover, when the voltage applied to the interelectrode is set high so as to make strong the electric field strength, a probability that a concentrated discharge occurs becomes high.

This voltage applying circuit applies only positive voltage having the same polarity to the interelectrode. When only voltage having the same polarity is applied to the interelectrode, there is a problem that the workpiece 52 or the like is corroded and deteriorated by an electrolytic effect. For this reason, in place of the voltage applying circuit 53 applying only voltage having the same polarity to the interelectrode, another voltage applying circuit, which generates positive and negative voltage pulse and applies it to the interelectrode, is used, and thereby, it is possible to reduce corrosion and deterioration of the workpiece 52 or the like.

FIG. 29 is a view showing a configuration of a conventional another voltage applying circuit. In the voltage applying circuit, in order to improve a machining speed and a final surface finish accuracy, machining is divided into several steps, and then, first, high speed rough machining is carried out, and thereafter, finishing after two-time machining is carried out. The voltage applying circuit includes a first voltage applying circuit 100 used for roughing and finishing, and a second voltage applying circuit 101 used for roughing. The first voltage applying circuit 100 includes a direct current constant voltage source 83, a capacitor 85, a resistor 97, FET 87, FET 88, FET 89 and FET 90. More specifically, the direct current constant voltage source 83 generates a predetermined voltage, the capacitor 85 has both terminals connected to both terminals of the direct current constant voltage source 83, and the resistor 97 has one end connecting the workpiece 52 via an inductance 98 included in the first voltage applying circuit and a current path. The FET 87 is interposed between a high voltage side of the direct current constant voltage source 83 and the wire 51, and the FET 88 is interposed between a low voltage side of the direct current constant voltage source 83 and the wire 51. The FET 89 is interposed between the high voltage side of the direct current constant voltage source 83 and the other end of the resistor 97, and the FET 90 is interposed between the low voltage side of the direct current constant voltage source 83 and the other end of the resistor 97.

The resistor 97 is additionally provided in order to limit a discharge current. The FET 87 to FET 90 constitute a full bridge circuit, and the FET 87 and the FET 90 are turned on at the same time, and thereby, a positive rectangular voltage pulse is applied to the wire 51 side. Further, the FET 88 and the FET 89 are turned on at the same time, and thereby, a negative rectangular voltage pulse is applied to the wire 51 side. Furthermore, the FET 88 and the FET 90 are turned on at the same time, and thereby, a voltage on the wire 51 side becomes 0V. The first voltage applying circuit 100 repeatedly turns on the FET 87 and the FET 90, the FET 88 and the FET 90, the FET 88 and the FET 89, and the FET 88 and the FET 90, and then, generates a positive and negative voltage pulse as shown in FIG. 30. FIG. 30 shows a voltage between the wire 51 side P61 of the FET 88 and the FET 90 side P62 of the resistor 97. In roughing, machining is carried out using a positive and negative voltage pulse generated by the first voltage applying circuit 100 without using the second voltage applying circuit 101.

On the other hand, the second voltage applying circuit 101 includes a direct current constant voltage source 84, a capacitor 86, a diode 95 and a diode 96, FET 91 and FET 92 and a diode 93 and a diode 94. More specifically, the direct current constant voltage source 84 generates a predetermined voltage, and the capacitor 86 has both terminals connected to both terminals of the direct current constant voltage source 84. The diode 95 has a cathode connected to the workpiece 52 via an inductance 99 included in the second voltage applying circuit and a current path, and the diode 96 has an anode connected to the wire 51. The FET 91 is interposed between a high voltage side of the direct current constant voltage source 84 and the anode of the diode 95, and the FET 92 is interposed between a low voltage side of the direct current constant voltage source 84 and the cathode of the diode 96. The diode 93 has an anode connected to the low voltage side of the direct current constant voltage source 84 and a cathode connected to the anode of the diode 95. The diode 94 has a cathode connected to the high voltage side of the direct current constant voltage source 84 and an anode connected to the cathode of the diode 96.

The FET 91 and the FET 92 are turned on at the same time, and thereby, a negative rectangular voltage pulse is applied to the wire 51 side. The second voltage applying circuit 101 has low impedance and a large capacitor; therefore, a peak discharge current having a high peak value flows. When the FET 91 and the FET 92 are turned off, a feedback current flows via the diodes 93 and 94 by an energy stored in the inductance 94. In roughing, high-speed machining is carried out using a peak discharge current (main discharge) having a high peak value by the second voltage applying circuit 101. However, in this case, the main discharge has a high peak value; for this reason, an abnormal discharge occurs, and sometimes the wire 51 wears out. In order to solve the problem, the first voltage applying circuit 100 helps the main discharge so as to generate a preliminary discharge for normally making a discharge.

FIG. 31 is a view to explain a conventional operation in roughing. In FIG. 31, a voltage between P61 and P62 is shown, and a voltage between a cathode terminal P63 of the diode 96 and an anode terminal P64 of the diode 95 is shown by a slant line. In roughing, as shown in FIG. 31, voltage application by the second voltage applying circuit 101 is carried out just after a positive voltage is applied by the first voltage applying circuit 100. Further, voltage application by the second voltage applying circuit 101 may be carried out just after a negative voltage is applied by the first voltage applying circuit 100. The second voltage applying circuit 101 applies only negative voltage having the same polarity to the interelectrode. However, a voltage applied to the interelectrode is low; therefore, there is almost no influence of corrosion and deterioration.

FIG. 32 is a view showing a relation between an applied voltage and a discharge current in conventional roughing. As shown in FIG. 32, in roughing, a voltage is applied by the first voltage applying circuit 100, and when a weak preliminary discharge occurs in the interelectrode, the voltage application is changed into voltage application by the second voltage applying circuit 101 as fast as possible so as to generate a strong peak main discharge between the interelectrode. A discharge detecting circuit (not shown) detects a preliminary discharge, and then, informs a control circuit (not shown) about the detection result.

When receiving the notification of detection result that preliminary discharged is started, the control circuit (not shown) controls the second voltage applying circuit 101 so that voltage application for main discharge is started, and simultaneously controls the first voltage applying circuit 100 so that the voltage application for preliminary discharge is stopped. It is desirable that a power exchange time tx until the voltage application for main discharge is started from the preliminary discharge occurs is set so as to become short as much as possible. Moreover, by making short a pulse interval until voltage application for starting the next preliminary discharge is carried out from the preliminary discharge occurs; it is possible to improve a machining speed. However, the more the pulse interval is made short, the more a concentrated discharge is easy to occur.

However, according to the aforesaid technique, a rectangular voltage pulse is used to generate a discharge; for this reason, when a voltage value of the rectangular voltage pulse is high, or when a gap interval is made small by dispersion, an interelectrode field strength becomes higher than a predetermined value. As a result, a problem has arisen such that a concentrated discharge occurs and the electrode wears out. In particular, in the case of carrying out a main discharge and a preliminary discharge, a concentrated discharge easily occurs. In this case, the energy of main discharge is great; for this reason, when a concentrated discharge occurs, the electrode wears out completely. Moreover, when a voltage value of the rectangular voltage pulse is low, or when a gap interval is made large by dispersion, the interelectrode field strength becomes lower than a predetermined value. As a result, a discharge time lag becomes long, and a machining speed becomes slow. In addition, a time-out of discharge comes; for this reason, a problem has arisen such that a discharge mistake generating no discharge increases.

SUMMARY OF THE INVENTION

It is an object of this invention to provide an electric discharge machining apparatus which can reduce a generation of concentrated discharge so as to prevent a breakdown of electrode, and can carry out high speed machining while reducing a discharge mistake.

The electric discharge machining apparatus according to one aspect of this invention comprises an electrode for generating an electric discharge between a workpiece and thereby machining the workpiece; and a voltage applying unit which applies a voltage pulse between the electrode and the workpiece. This voltage applying unit applies a voltage pulse which has a rise time longer than a discharge formative time lag when a rectangular voltage pulse is applied when a distance between the workpiece and the electrode is an average value in machining and rises up to the same voltage value as the rectangular voltage pulse.

According to the above-mentioned aspect of this invention, the voltage applying unit applies a voltage pulse between a workpiece and an electrode so as to generate an electric discharge between the workpiece and the electrode. The voltage pulse has a rise time longer than a discharge formative time lag when a rectangular voltage pulse is applied when a distance between the workpiece and the electrode is an average value in machining, and rises up to the same voltage value as the rectangular voltage pulse. By doing so, in accordance with a gap interval, an interelectrode voltage is increased to a dischargeable voltage value, while a normal discharge is started before the interelectrode voltage becomes a voltage value generating a concentrated discharge.

The electric discharge machining apparatus according to another aspect of this invention comprises an electrode for generating an electric discharge between a workpiece and thereby machining the workpiece; a second voltage applying unit which applies a second voltage pulse between the electrode and the workpiece so as to generate a second electric discharge with a second electric current; and a first voltage applying unit which applies a first voltage pulse between the electrode and the workpiece so as to generate a first electric discharge with a first electric current which is larger than the second electric current. The first voltage applying unit applies the first voltage pulse which has a rise time longer than a discharge formative time lag when a rectangular voltage pulse is applied when a distance between the workpiece and the electrode is an average value in machining and rises up to the same voltage value as the rectangular voltage pulse when generating the first electric discharge.

According to the above-mentioned aspect of this invention, the first voltage applying unit applies a voltage pulse between a workpiece and an electrode so as to generate a first electric discharge between the workpiece and the electrode. The voltage pulse has a rise time longer than a discharge formative time lag when a rectangular voltage pulse is applied when a distance between the workpiece and the electrode is an average value in machining, and rises up to the same voltage value as the rectangular voltage pulse. By doing so, in accordance with a gap interval, an interelectrode voltage is increased to a dischargeable voltage value, while a normal discharge is started before the interelectrode voltage becomes a voltage value generating a concentrated discharge.

Further, in the electric discharge machining apparatus, it is preferable that the rise time of the voltage pulse is set to 0.1 micro seconds or more and 100 micro seconds or less.

Thus, the rise time of the voltage pulse is set to 0.1 $\mu$s or more and 100 $\mu$s or less. By doing so, in accordance with a gap interval, an interelectrode voltage is increased to a dischargeable voltage value, while a normal discharge is started before the interelectrode voltage becomes a voltage value generating a concentrated discharge.

Further, in the electric discharge machining apparatus, it is preferable that the voltage applying unit includes a direct current constant voltage source generating a predetermined voltage; and a capacitor-resistor circuit for dulling a rise of voltage generated by the direct current constant voltage source so as to generate the voltage pulse.

The direct current constant voltage source generates a predetermined voltage, and the capacitor-resistor circuit gets dull a rise of voltage generated by the direct current constant voltage source so as to generate the voltage pulse. Therefore, it is possible to generate a voltage pulse by a simple circuit.

Further, in the electric discharge machining apparatus, it is preferable that the voltage applying unit includes a capacitor which generates the voltage pulse by a voltage between both terminals of the capacitor; and a direct current constant current source for supplying a current to the capacitor until the voltage between both terminals of the capacitor becomes a predetermined value.

The capacitor generates the voltage pulse by a voltage between both terminals of the capacitor, and the direct current constant current source supplies a current to the capacitor until the voltage between both terminals of the capacitor becomes a predetermined value. By doing so, it is possible to generate a voltage pulse having a voltage value rising up in proportional to an applied time.

Further, in the electric discharge machining apparatus, it is preferable that the voltage applying unit includes a first direct current constant voltage source for generating a first predetermined voltage, and raises the voltage pulse to the first voltage; and a second direct current voltage source for generating a second voltage higher than the first voltage, and raises the voltage pulse from the first voltage to the second voltage.

The first direct current constant voltage source generates a first predetermined voltage and raises the voltage pulse to the first voltage, and the second direct current voltage source generates a second voltage higher than the first voltage and raises the voltage pulse from the first voltage to the second voltage. By doing so, the voltage pulse rapidly rises up to the first voltage, and thereafter, the voltage pulse rises up to the second voltage.

Further, in the electric discharge machining apparatus, it is preferable that the voltage applying unit further includes a capacitor-resistor circuit for getting dull the voltage pulse rising from the first voltage to the second voltage.

The capacitor-resistor circuit gets dull the voltage pulse rising from the first voltage to the second voltage. Therefore, it is possible to generate a voltage pulse by a simple circuit.

Further, in the electric discharge machining apparatus, it is preferable that the voltage applying unit includes a capacitor which generates the voltage pulse by a voltage between both terminals of the capacitor; a first direct current constant voltage source for setting the voltage between both terminals of the capacitor to a predetermined first voltage before the voltage pulse application is started; and a direct current constant current source for supplying a current to the capacitor until the voltage between both terminals of the capacitor becomes a second voltage higher than the first voltage after the voltage pulse application is started.

The capacitor generates the voltage pulse by a voltage between both terminals of the capacitor, and the first direct current constant voltage source sets the voltage between both terminals of the capacitor to a predetermined first voltage before the voltage pulse application is started. Further, the direct current constant current source supplies a current to the capacitor until the voltage between both terminals of the capacitor becomes a second voltage higher than the first voltage after the voltage pulse application is started. By doing so, first, the voltage pulse rapidly rises up to the first voltage, and thereafter, the voltage pulse rises up to the second voltage in proportional to an applied time.

Further, in the electric discharge machining apparatus, it is preferable that the first voltage is set to 0V or more and 100V or less, and the second voltage is set to 60V or more and 300V or less.

The first voltage is set to 0V or more and 100V or less, and the second voltage is set to 60V or more and 300V or less. By doing so, in accordance with a gap interval, an interelectrode voltage is increased to a dischargeable voltage value, while a normal discharge is started before the interelectrode voltage becomes a voltage value generating a concentrated discharge.

Other objects and features of this invention will become apparent from the following description with reference to the accompanying drawings.

DESCRIPTION OF THE PREFERRED EMBODIMENTS

Preferred embodiments of the present invention will be described below with reference to the accompanying drawings. In this case, the present invention is not limited to the embodiments.

Figure 1:
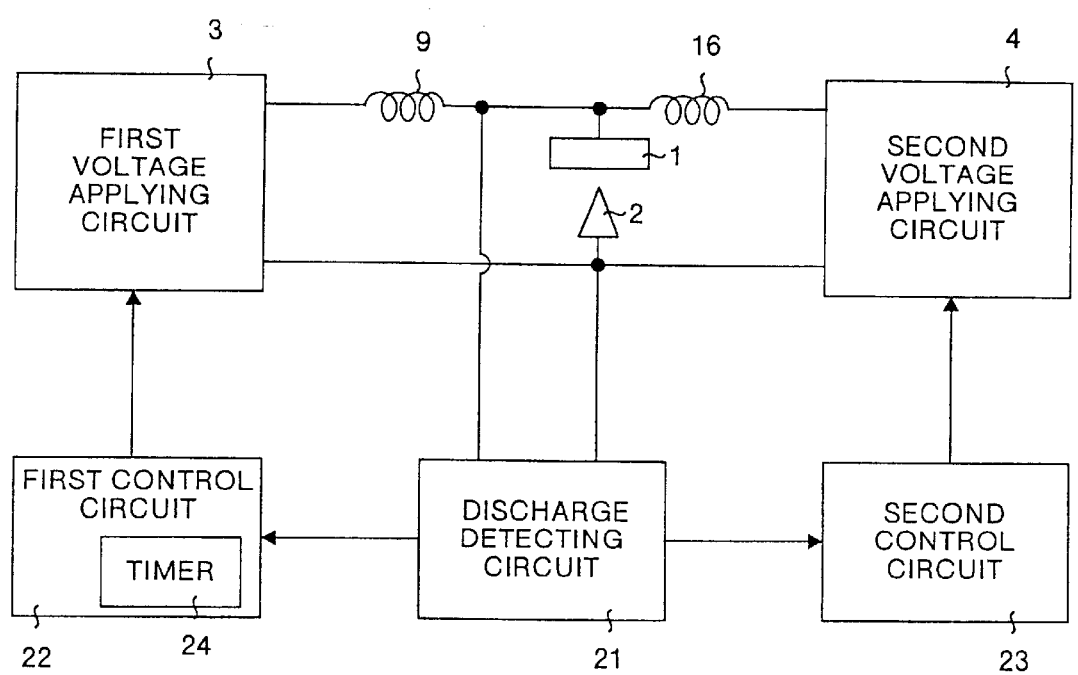
FIG. 1 is a view schematically showing a construction of an electric discharge machining apparatus according to a first embodiment of the present invention.
Figure 23:
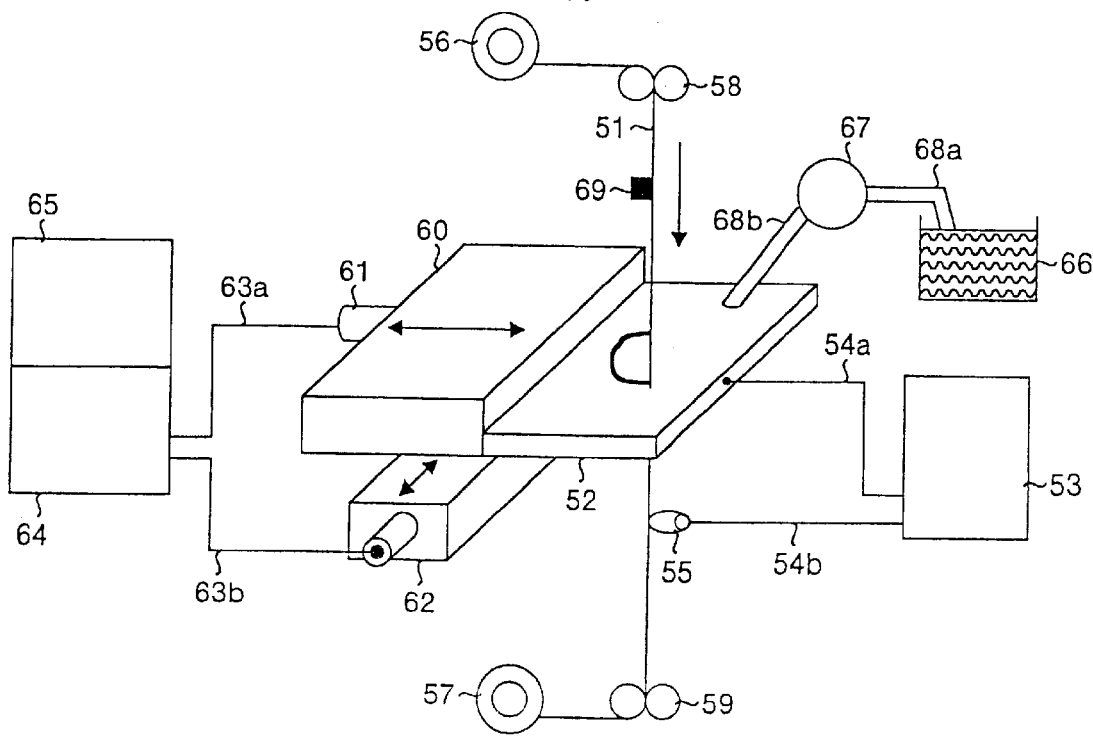
FIG. 23 is a view schematically showing a construction of a conventional electric discharge machining apparatus.
Figure 24:
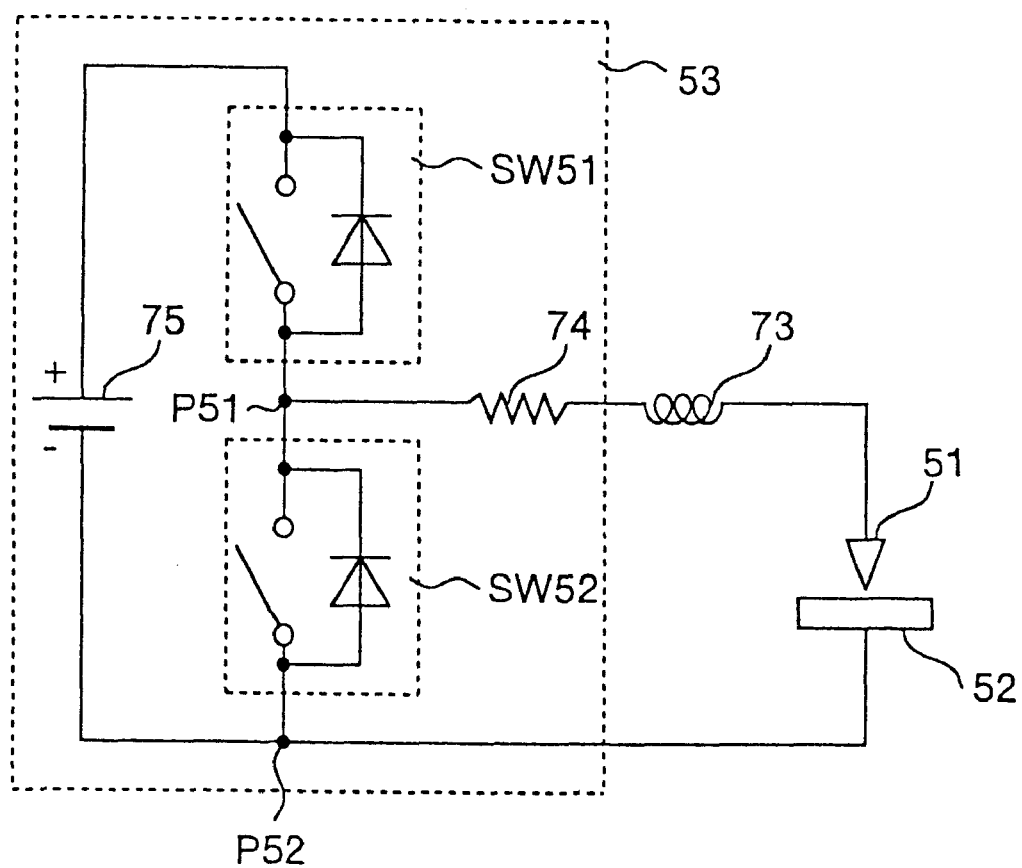
FIG. 24 is a view showing a configuration of a conventional voltage applying circuit shown in FIG. 23.
Figure 25:
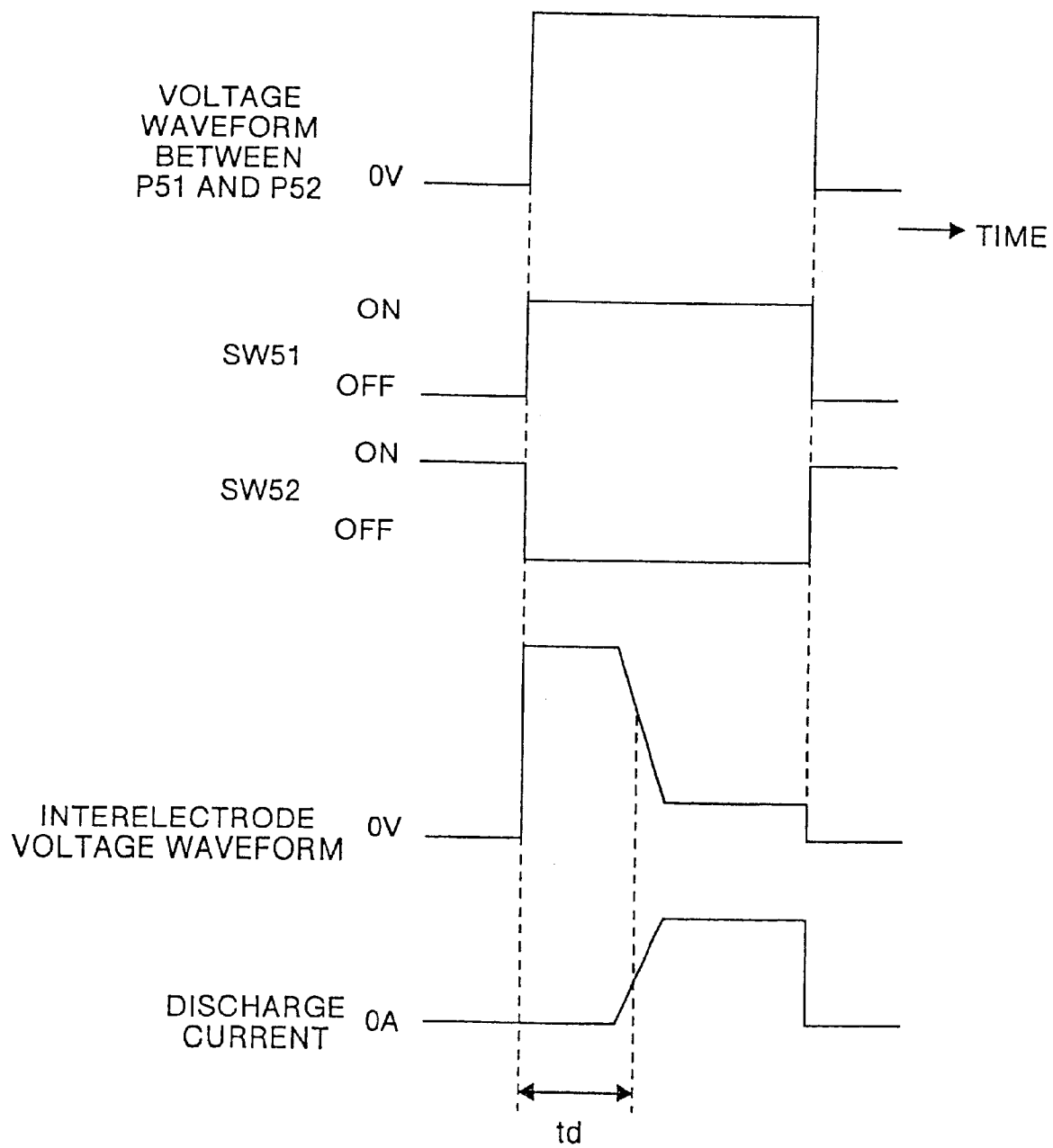
FIG. 25 is a view showing an operation of the conventional voltage applying circuit.
Figure 26:
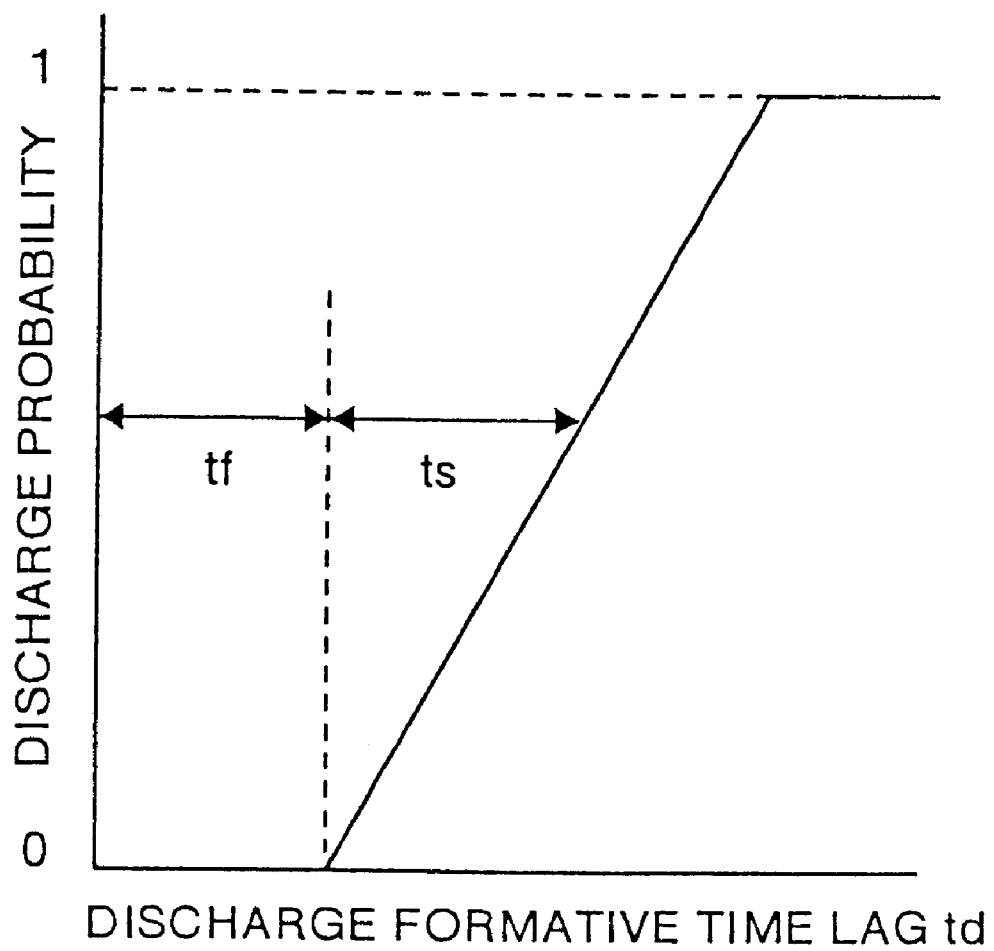
FIG. 26 a graph showing a relation between a discharge formative time lag and a discharge probability in a conventional electric discharge machining apparatus.
Figure 27:
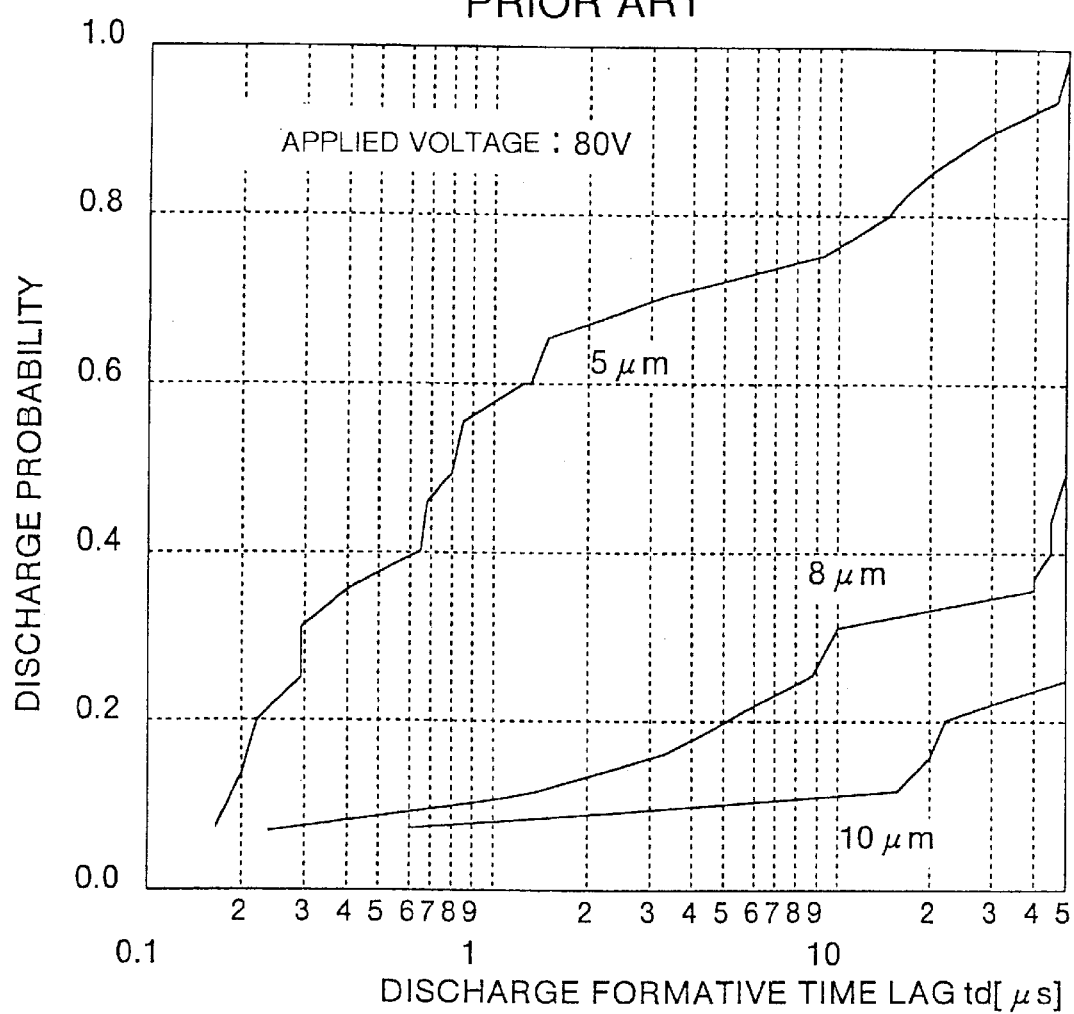
FIG. 27 is a graph showing a relation between a discharge time lag, a discharge probability and a gap interval in the conventional electric discharge machining apparatus.
Figure 28:
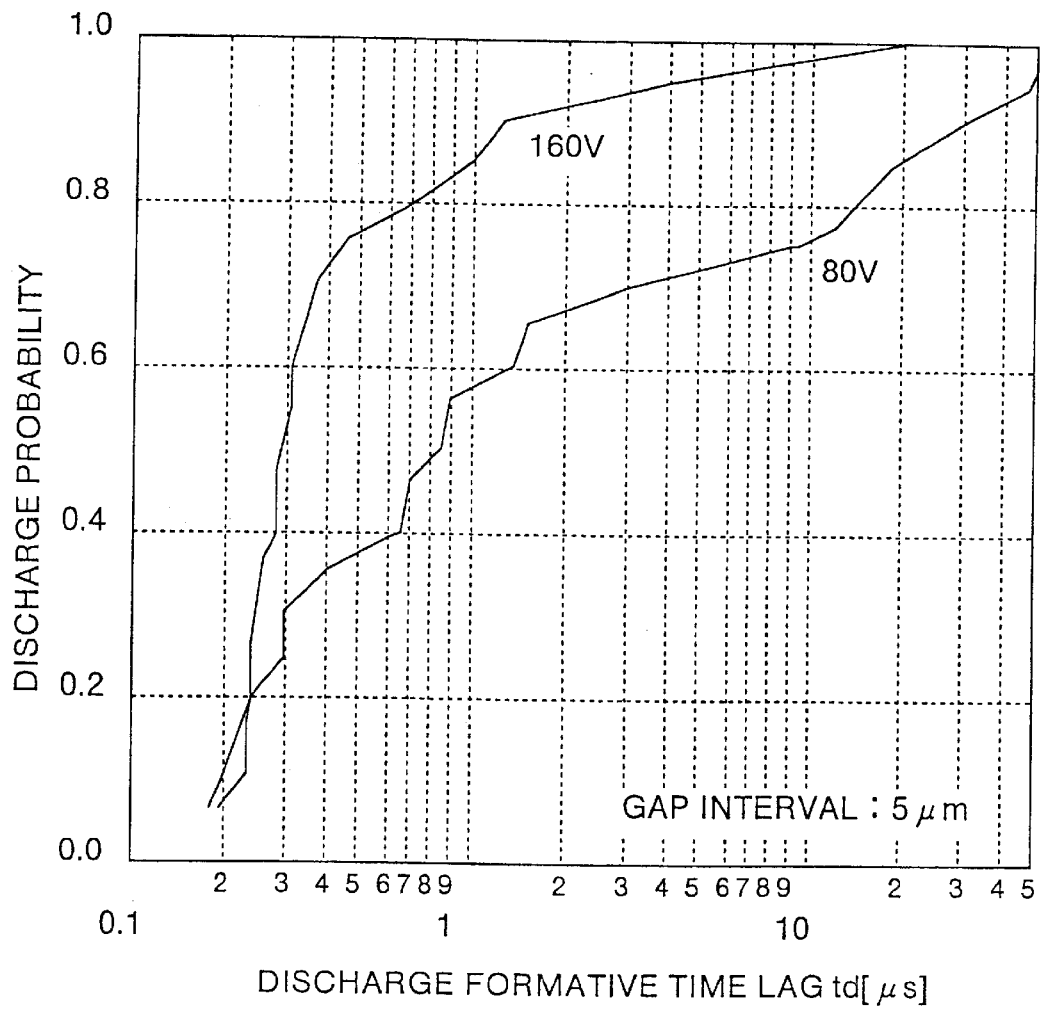
FIG. 28 is a graph showing a relation between a discharge time lag, a discharge probability and an applied voltage in the conventional electric discharge machining apparatus.
Figure 29:
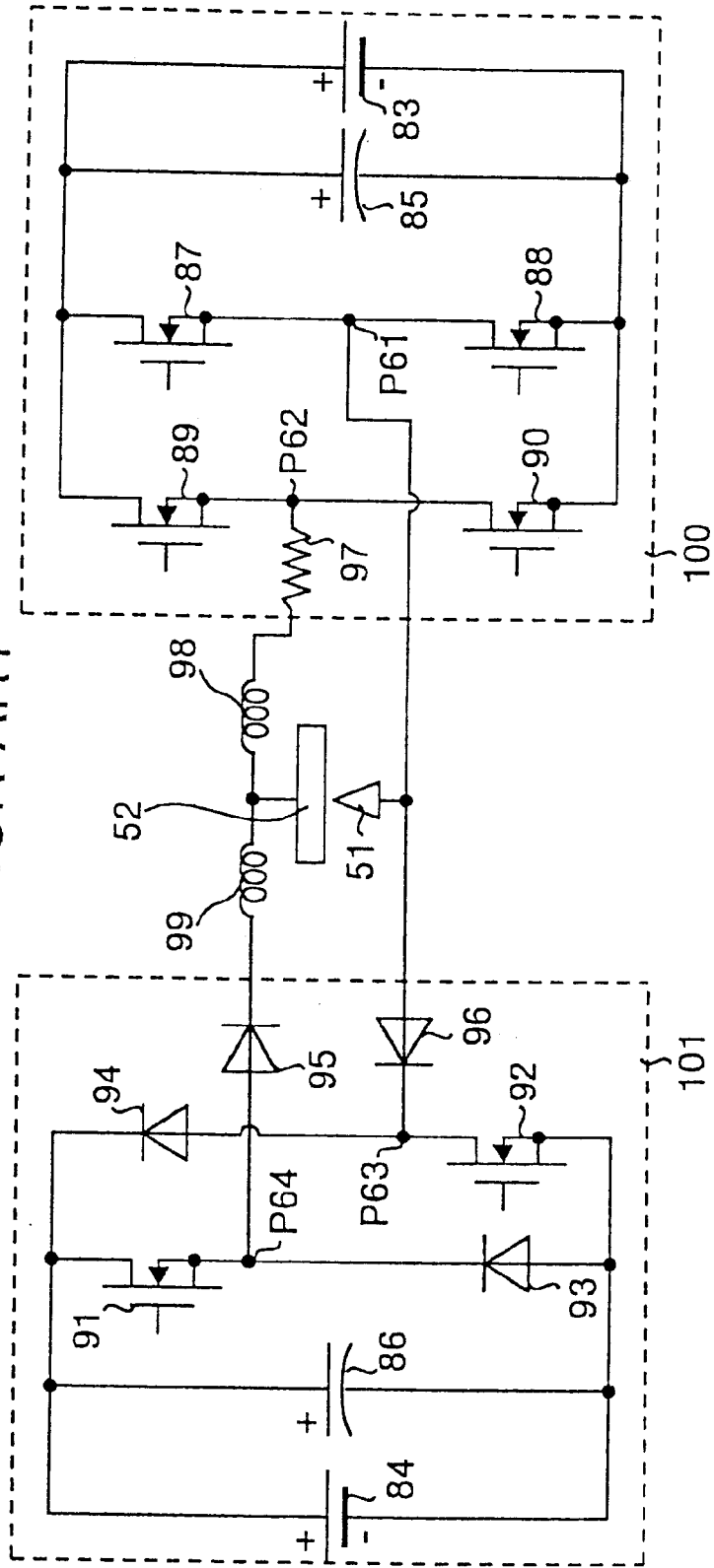
FIG. 29 is a view showing a configuration of a conventional another voltage applying circuit.
Figure 30:
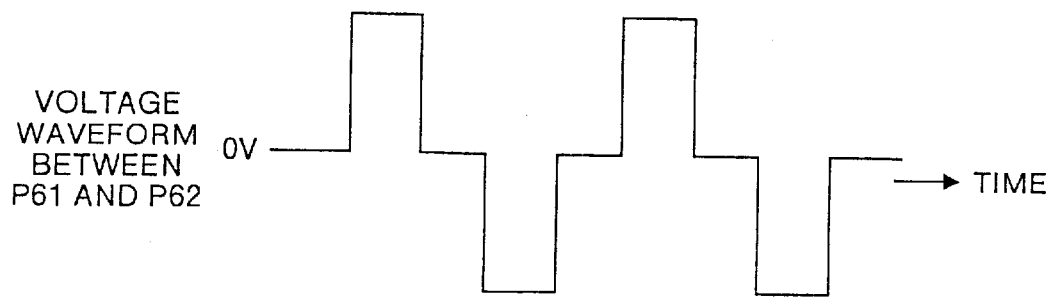
FIG. 30 is a view showing an operation in conventional finishing.
Figure 31:
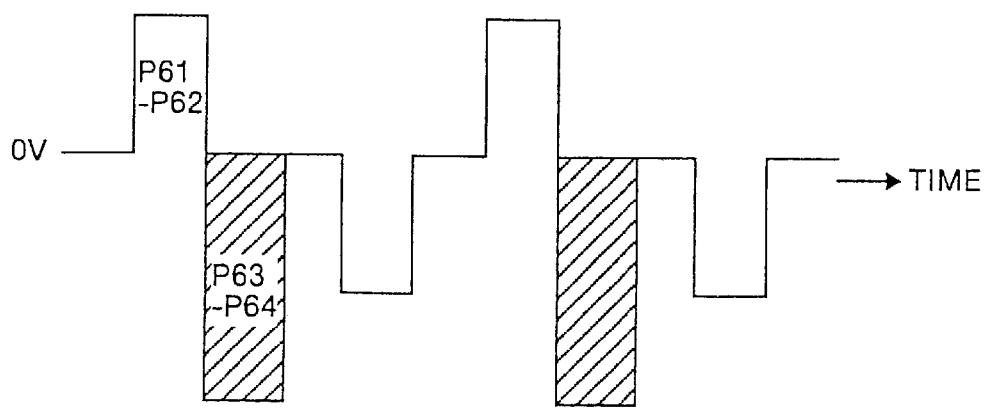
FIG. 31 is a view showing an operation in conventional roughing.
Figure 32:
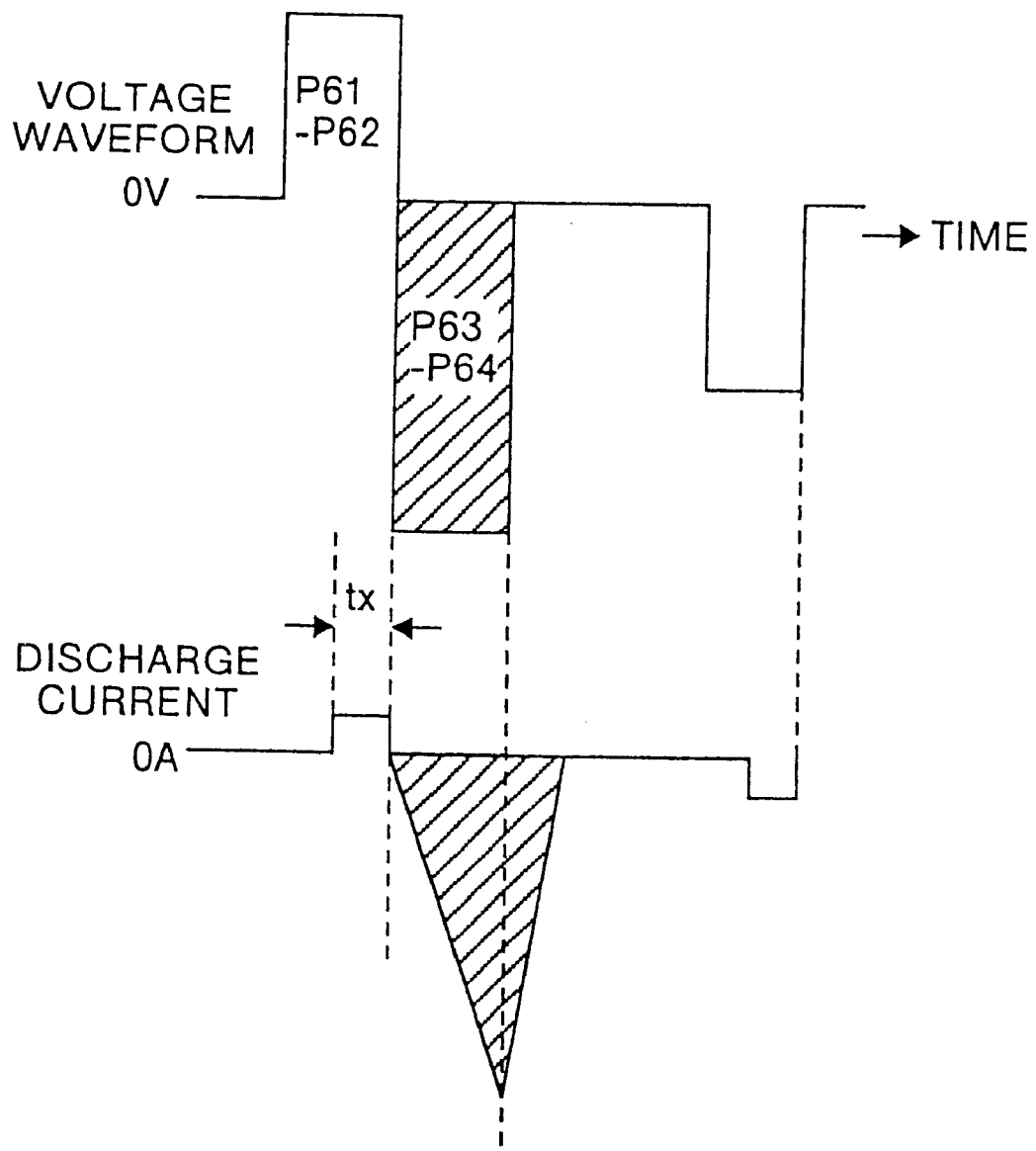
FIG. 32 is a view showing a relation between an applied voltage and a discharge current in conventional roughing.

FIG. 1 is a view schematically showing a configuration of an electric discharge machining apparatus according to a first embodiment of the present invention. The electric discharge machining apparatus is a wire electric discharge machine using a conductive wire 2 as an electrode for carrying out machining with respect to a workpiece 1. For example, as the wire 2, a copper wire or brass wire having a diameter of 0.3 mm to 0.03 mm. Further, the electric discharge machining apparatus includes an NC device (not shown), a cross table, an X-axis motor, a Y-axis motor, a device for feeding and winding the wire 2, and a device for supplying a working fluid, like the conventional wire electric discharge machine shown in FIG. 23.

Moreover, the wire electric discharge machining apparatus includes a first voltage applying circuit 3, a second voltage applying circuit 4, a discharge detecting circuit 21, a first control circuit 22 and a second control circuit 23. More specifically, the first voltage applying circuit 3 is used for roughing and finishing, and the second voltage applying circuit 4 is used for roughing. The discharge detecting circuit 21 detects a generation of preliminary discharge between the workpiece 1 and the wire 2 (hereinafter, referred simply to as interelectrode). The first control circuit 22 controls the first voltage applying circuit 3 on the basis of the detection result of the discharge detecting circuit 21, and the second control circuit 23 controls the second voltage applying circuit 4 on the basis of the detection result of the discharge detecting circuit 21. The first voltage applying circuit 3 generates positive and negative voltage pulse, and then, applies the generated voltage to the interelectrode so as to generate a discharge for finishing and a preliminary discharge for roughing.

The second voltage applying circuit 4 generates a negative voltage pulse, and then, applies the generated negative voltage to the interelectrode so as to generate a main discharge for roughing. The discharge detecting circuit 21 detects a generation of preliminary discharge, and then, informs the first and second control circuits 22 and 23 about the detection result. The first control circuit 22 has a timer 24 for counting a pulse interval, and when receiving the detection result indicative that a preliminary discharge is started, controls the first voltage applying circuit 3 so that voltage application is stopped, while starting a count of pulse interval. Then, when the count of pulse interval is completed, the first voltage applying circuit 22 controls the first voltage applying circuit 3 so that a voltage pulse for generating the next preliminary discharge is applied to the interelectrode.

On the other hand, when receiving the detection result indicative that a preliminary discharge is started, the second control circuit 23 controls the second voltage applying circuit 4 so that a voltage pulse for generating a main discharge is applied to the interelectrode. The discharge detecting circuit 21, the second voltage applying circuit 4 and the second control circuit 23 are quickly operated so that a power exchange time until a voltage pulse for generating a main discharge is applied from the preliminary discharge is started becomes short as much as possible. Moreover, a pulse interval is made short, and thereby, a machining speed is improved; however, when the pulse interval is made too short, a concentrated discharge easily occurs. Therefore, the pulse interval is set more than a predetermined value having no generation of the concentrated discharge.

Figure 2:
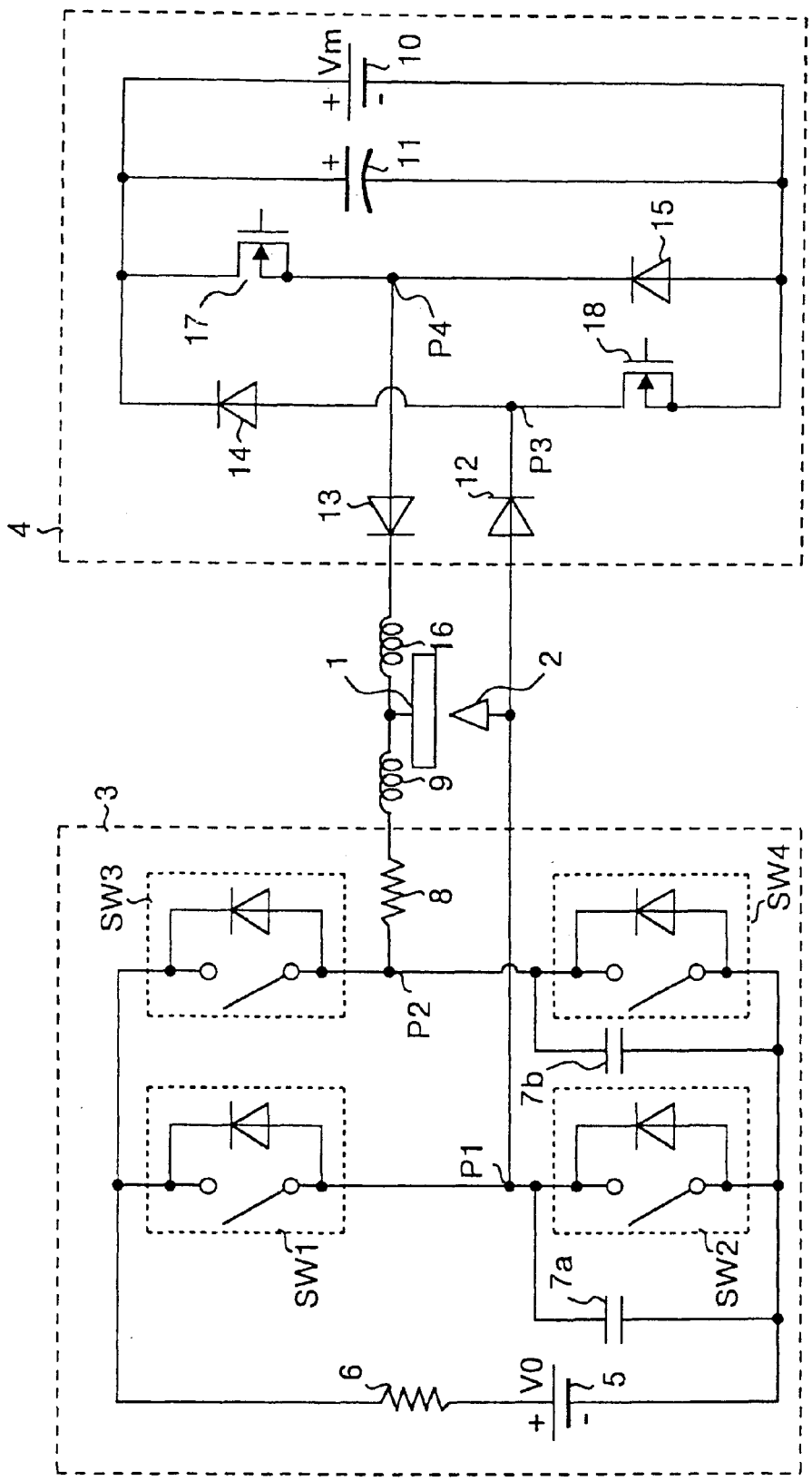
FIG. 2 is a view schematically showing each configuration of a first voltage applying circuit and a second voltage applying circuit shown in FIG. 1.

FIG. 2 is a view showing each configuration of the first voltage applying circuit 3 and the second voltage applying circuit 4 shown in FIG. 1. The first voltage applying circuit 3 includes a direct current constant voltage source 5, resistors 6 and 8, switches SW1 and SW2, a capacitor 7*a*, SW3 and SW4, and a capacitor 7*b*. More specifically, the direct current constant voltage source 5 generates a predetermined voltage V0. The resistor 6 has one end connected to a high voltage side of the direct current constant voltage source 5, and the resistor 8 has one end connected to the workpiece 1 via an inductance 9 included in the first voltage applying circuit and a current path. The switch SW1 is interposed between the other end of the resistor 6 and the electrode 2, and the switch SW2 is interposed between the electrode 2 and a low voltage side of the direct current constant voltage source 5. The capacitor 7*a* is interposed between the electrode 2 and the low voltage side of the direct current constant voltage source 5. The switch SW3 is interposed between the other end of the resistor 6 and the other end of the resistor 8, and the switch SW4 is interposed between the other end of the resistor 6 and the low voltage side of the direct current constant voltage source 5. The capacitor 7*b* is interposed between the other end of the resistor 6 and the low voltage side of the direct current constant voltage source 5.

The resistor 8 is additionally provided in order to limit a discharge current. A capacitor is used as the capacitors 7*a* and 7*b*, and the capacitor has a sufficient frequency characteristic with respect to a rise time of the voltage pulse generated by the first voltage applying circuit 3. In this case, the rise time means a time until an absolute value of voltage pulse reaches 90% of the maximum value after it exceeds 10% of the maximum value. A transistor such as FET or the like is used as the switches SW1 to SW4, for example. These switches SW1 to SW4 constitute a full bridge circuit, and then, when the switches SW1 and SW4 are turned on, a positive voltage pulse is applied to the wire 2 side. Moreover, when the switches SW2 and SW3 are turned on, a positive voltage pulse is applied to the wire 2 side.

On the other hand, the second voltage applying circuit 4 includes a direct current constant voltage source 10, a capacitor 11, a diode 13 and a diode 12, and FET17 and FET 18, a diode 15 and a diode 14. More specifically, the direct current constant voltage source 10 generates a predetermined voltage Vm, and the capacitor 11 has both terminals connected to both terminals of the direct current constant voltage source 10. The diode 13 has a cathode connected to the workpiece 1 via an inductance 16 included in the second voltage applying circuit 4 and a current path, and the diode 12 has an anode connected to the electrode 2. The FET17 is interposed between a high voltage side of the direct current constant voltage source 10 and the anode of the diode 13, and the FET 18 is interposed between a low voltage side of the direct current constant voltage source 10 and the cathode of the diode 12. The diode 15 has an anode connected to the low voltage side of the direct current constant voltage source 10 and a cathode connected to the anode of the diode 13. On the other hand, the diode 14 has a cathode connected to the high voltage side of the direct current constant voltage source 10 and an anode connected to the cathode of the diode 12.

When the FET 17 and FET 18 are turned on at the same time, a negative rectangular voltage pulse is applied to the wire 2 side. The second voltage applying circuit 4 has low impedance and a large capacitor; therefore, a peak discharge current having a high peak value flows through there. When the FET 17 and the FET 18 are turned off, by an energy stored in the inductance 16, a feedback current flows via the diodes 14 and 15. In roughing, high-speed machining is carried out using a peak discharge current (main discharge) having a high peak value by the second voltage applying circuit 4. However, in this case, the main discharge has a high peak value; for this reason, an abnormal discharge occurs. As a result, a problem arises such that the wire 2 wears out. In order to solve the problem, the first voltage applying circuit 3 helps the main discharge so as to generate a preliminary discharge for normally making a discharge.

Figure 3:
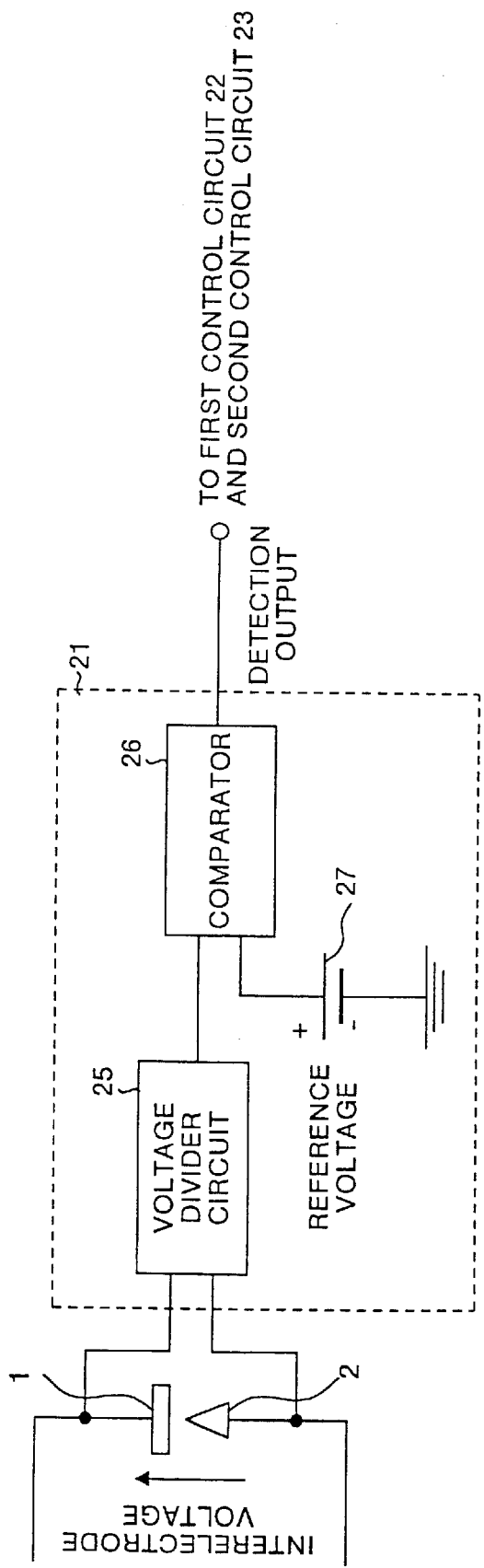
FIG. 3 is a view schematically showing a configuration of a discharge detecting circuit shown in FIG. 1.

FIG. 3 is a view schematically showing a configuration of the discharge detecting circuit 21 shown in FIG. 1. The discharge detecting circuit 21 includes a voltage divider circuit 25, a direct current constant voltage source 27, and a comparator 26. The voltage divider circuit 25 divides an interelectrode voltage so as to generate a divided voltage, and the direct current constant voltage source 27 generates a reference voltage for making a comparison with the divided voltage. The comparator 26 compares the divided voltage with the reference voltage, and then, outputs the comparative result as the detection result. The interelectrode voltage rises up by applying a voltage pulse generated by the first voltage applying circuit 3, but drops down with the start of preliminary discharge. The voltage divider circuit 25 divides an interelectrode voltage so as to generate a divided voltage suitable for comparison.

In order to distinguish a divided voltage before the start of preliminary discharge from a divided voltage after the start of preliminary discharge, the reference voltage generated by the direct current constant voltage source 27 is set to an intermediate value of these divided voltage values. The comparator 26 compares the divided voltage with the reference voltage, and then, outputs a high level signal in the case before the start of preliminary discharge. On the other hand, after the start of preliminary discharge, when an interelectrode voltage drops and the divided voltage drops, the comparator 26 outputs a low level signal. The first and second control circuits 22 and 23 makes a decision such that a preliminary discharge is started, when the output signal of the comparator 26 changes from a high level to a low level.

Figure 4:
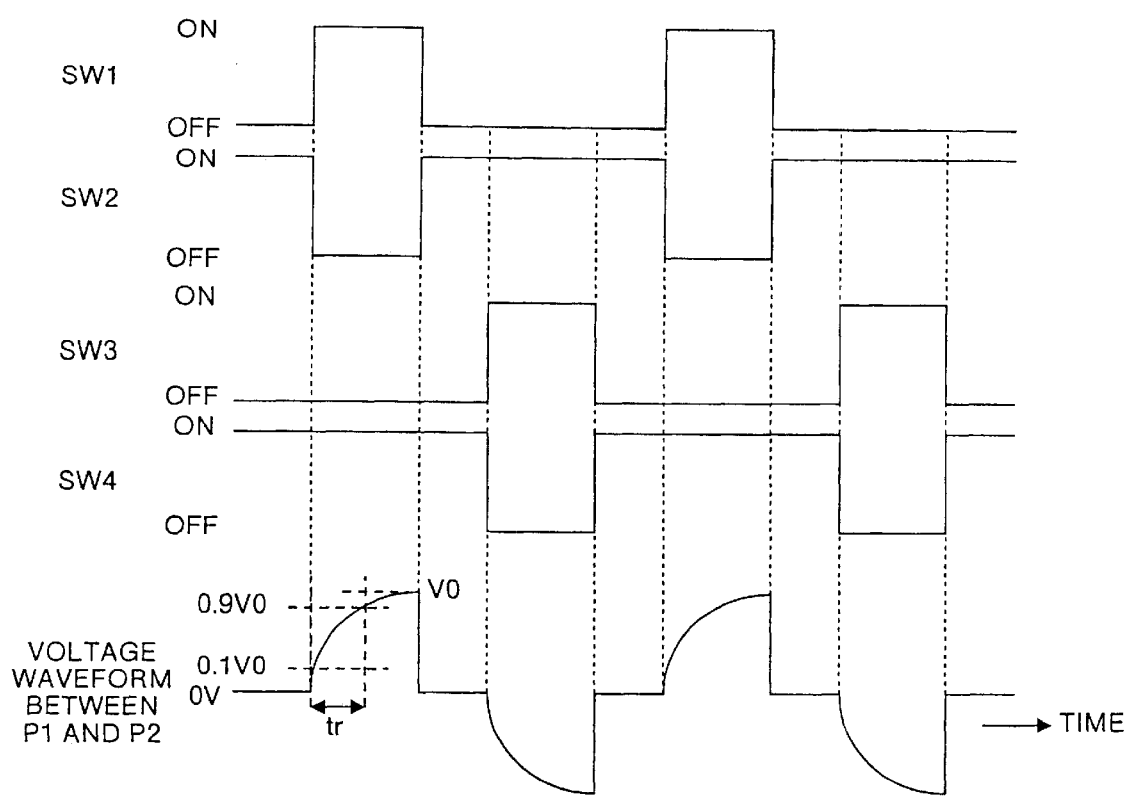
FIG. 4 is a timing chart showing an operation of the first voltage applying circuit according to the first embodiment.

With the above construction, an operation of this first embodiment will be described below with reference to FIG. 4 to FIG. 8. FIG. 4 is a timing chart showing an operation of the first voltage applying circuit 3 according to the first embodiment. In the operation of the first voltage applying circuit 3, before a voltage pulse is applied to the interelectrode, the switches SW2 and SW4 are turned on so that the capacitors 7*a* and 7*b* are discharged. Moreover, the switches SW1 and SW3 are turned off. In the case of applying a positive voltage pulse, the turn-on of the switch SW1 and the turn-off of the switch SW2 are made at the same time. By doing so, a charge of the capacitor 7*a* is started, and thereafter, a voltage rises up between the electrode 2 side P1 of the switch SW2 and the switch SW4 side P2 of the resistor 8, and thus, an interelectrode voltage rises up. The turn-off of the switch SW1 and the turn-on of the switch SW2 are made at the same time, and thereby, the application of positive voltage pulse is completed.

Moreover, in the case of applying a negative voltage pulse, the turn-on of the switch SW3 and the turn-off of the switch SW4 are made at the same time. By doing so, a charge of the capacitor 7*b* is started, then, the voltage between P1 and P2 drops, and thus, an interelectrode voltage drops. The turn-off of the switch SW3 and the turn-on of the switch SW4 are made at the same time, and thereby, the application of negative voltage pulse is completed. When the application of positive and negative voltage pulse is started, an absolute value of-the voltage between P1 and P2 gently rises up to a voltage V0 generated by the direct current constant voltage source 5. The voltage pulse becomes a "rounding waveform (CR waveform)" making dull the rise-up of pulse. A time constant of the convex CR waveform is determined in accordance with a capacitance of the capacitors 7a and 7b and a resistance value of the resistor 6.

Figure 5:
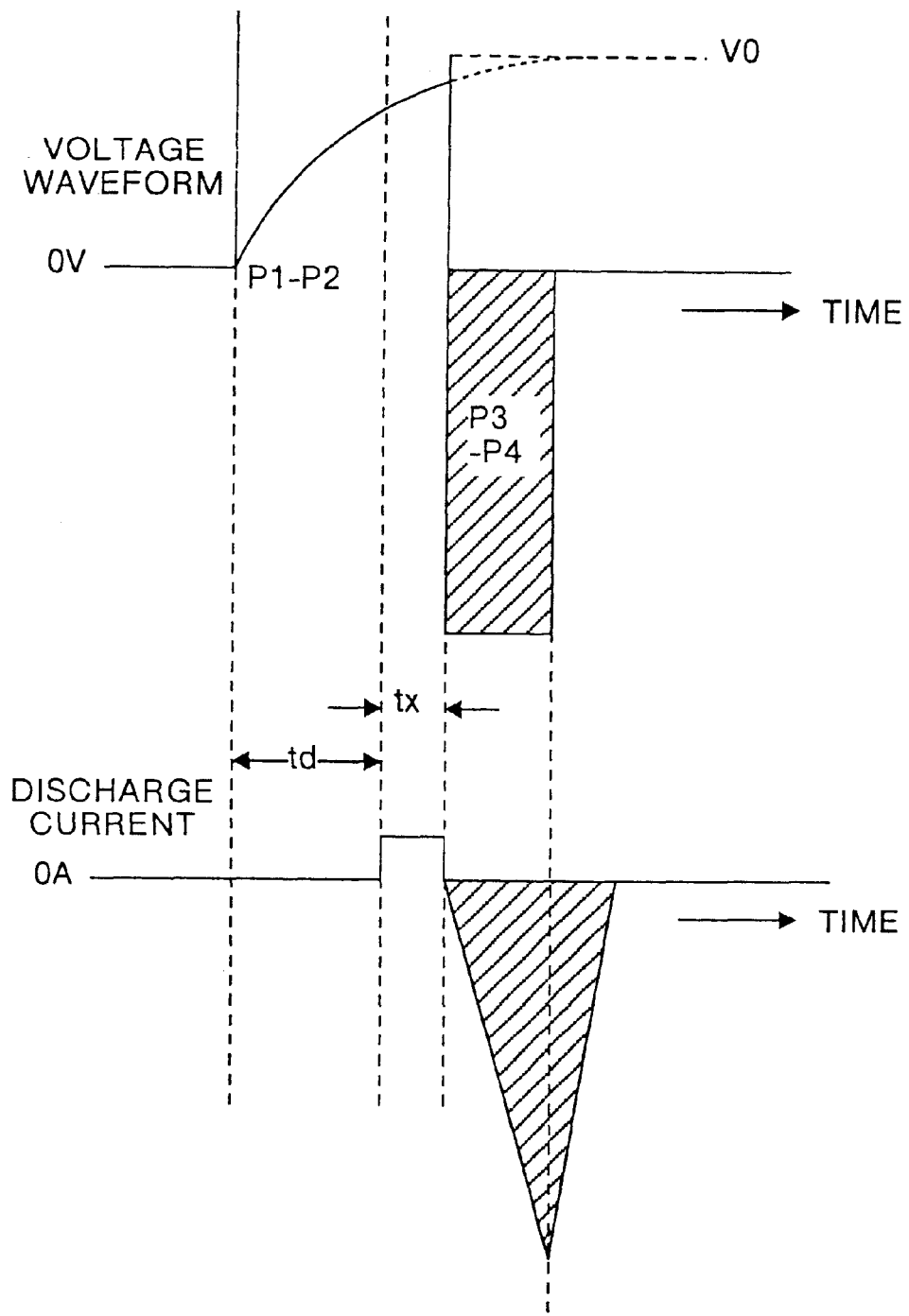
FIG. 5 is a timing chart showing an operation in roughing in the first embodiment.

FIG. 5 is a timing chart showing an operation in roughing according to the first embodiment. In FIG. 5, a voltage between P1 and P2 is shown, and a voltage between a cathode terminal P3 of the diode 12 and an anode terminal P4 of the diode 13 is shown by a slant line. In roughing, as shown in FIG. 5, the voltage application by the second voltage applying circuit 4 is carried out just after a positive voltage is applied by the first voltage applying circuit 3. Further, the voltage application by the second voltage applying circuit 4 may be carried out just after a negative voltage is applied by the first voltage applying circuit 3. In roughing, when a weak preliminary discharge occurs between the interelectrodes by the voltage application by the first voltage applying circuit 3, the voltage application is quickly changed to voltage application by the second voltage applying circuit 4 as much as possible so that a peak and strong main discharge occurs between the interelectrodes. It is desirable that a power exchange time tx until the voltage application of main discharge is started after the preliminary discharge occurs is set as short as possible.

Figure 6:
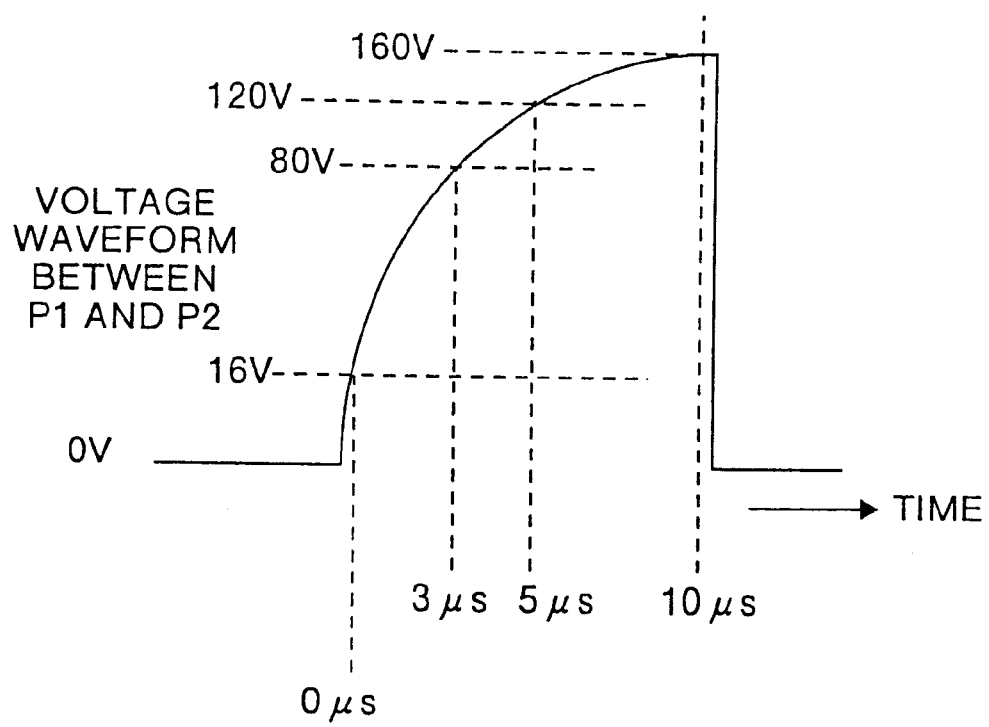
FIG. 6 is a view showing a voltage waveform of the first voltage applying circuit according to the first embodiment.

FIG. 6 is a view showing a waveform of voltage pulse generated by the first voltage applying circuit 3 according to the first embodiment. In FIG. 6, although a positive voltage pulse is shown, a negative voltage pulse is considered same as the positive voltage pulse except polarity. More specifically, a relation between the voltage pulse generated by the first voltage applying circuit 3 and discharge is considered as an absolute value. Hereinafter, so long as no reference is made in particular, the "voltage pulse" means a voltage pulse of absolute value including positive and negative directions.

The voltage pulse generated by the first voltage applying circuit 3 is a CR waveform, and gently rises up to the maximum value. The maximum value of the voltage pulse is set to voltage value capable of generating a discharge at a high probability even when an interelectrode distance (hereinafter, referred to as gap interval) becomes wider resulting from the vibration of wire 2 and unevenness of the workpiece 1. In this first embodiment, the voltage pulse generated by the first voltage applying circuit 3 has the maximum value of 160V, and becomes 80V after 3 $\mu$s from when exceeding 16V, which is equivalent to 10% of the maximum value. Then, the voltage pulse becomes 120V after 5 $\mu$s, and subsequently, becomes the maximum value of 160V after 10 $\mu$s.

A rise time tr of the voltage pulse is longer than a formative time lag in the case of applying a rectangular voltage pulse of 160V to the interelectrode. In the case of a rise time tr shorter than the formative time lag, the voltage pulse becomes a waveform close to a rectangular waveform, and before the start of discharge, the voltage value becomes sufficiently high; therefore, a probability of generating a concentrated discharge becomes high. The formative time lag is about 0.1 $\mu$s although it depends upon a voltage applied to the interelectrode and a gap interval. On the other hand, when the rise time tr is made too long, a desired machining speed is not obtained. Accordingly, the rise time tr is set more than 0.1 $\mu$s and less than 100 $\mu$s.

Figure 7:
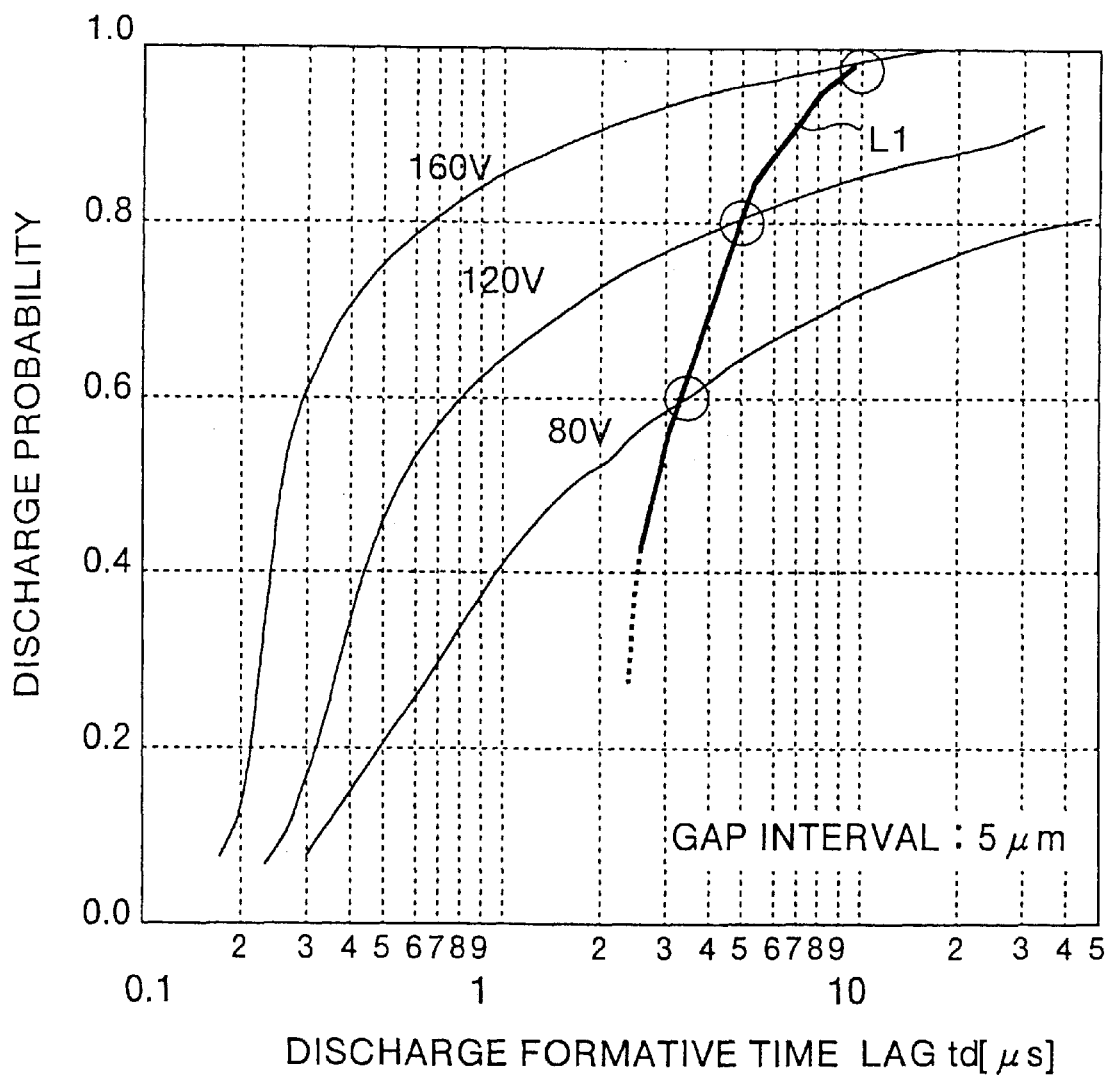
FIG. 7 is a graph showing a relation between a discharge formative time lag and a discharge probability in the first embodiment.

FIG. 7 is a view showing a relation between a discharge formative time lag and a discharge probability in the first embodiment. In the case of applying a voltage pulse having CR waveform generated by the first voltage applying circuit 3 to the interelectrode, a discharge probability after X time elapses from when the voltage pulse exceeds 10% of the maximum value, is as follows. More specifically, the above discharge probability is equal substantially to a discharge probability in the case of applying a rectangular voltage pulse having the same voltage value as the voltage pulse at the point of time for X time. In FIG. 6, a discharge probability after 3 $\mu$s elapses from when the voltage pulse exceeds 10% of the maximum value, is equal substantially to a discharge probability in the case of applying a rectangular voltage pulse of 80V for 3 $\mu$s. Further, a discharge probability after 5 $\mu$s elapses is equal substantially to a discharge probability in the case of applying a rectangular voltage pulse of 120V for 5 $\mu$s. Furthermore, a discharge probability after 10 $\mu$s elapses is equal substantially to a discharge probability in the case of applying a rectangular voltage pulse of 160V for 10 $\mu$s.

Figure 8:
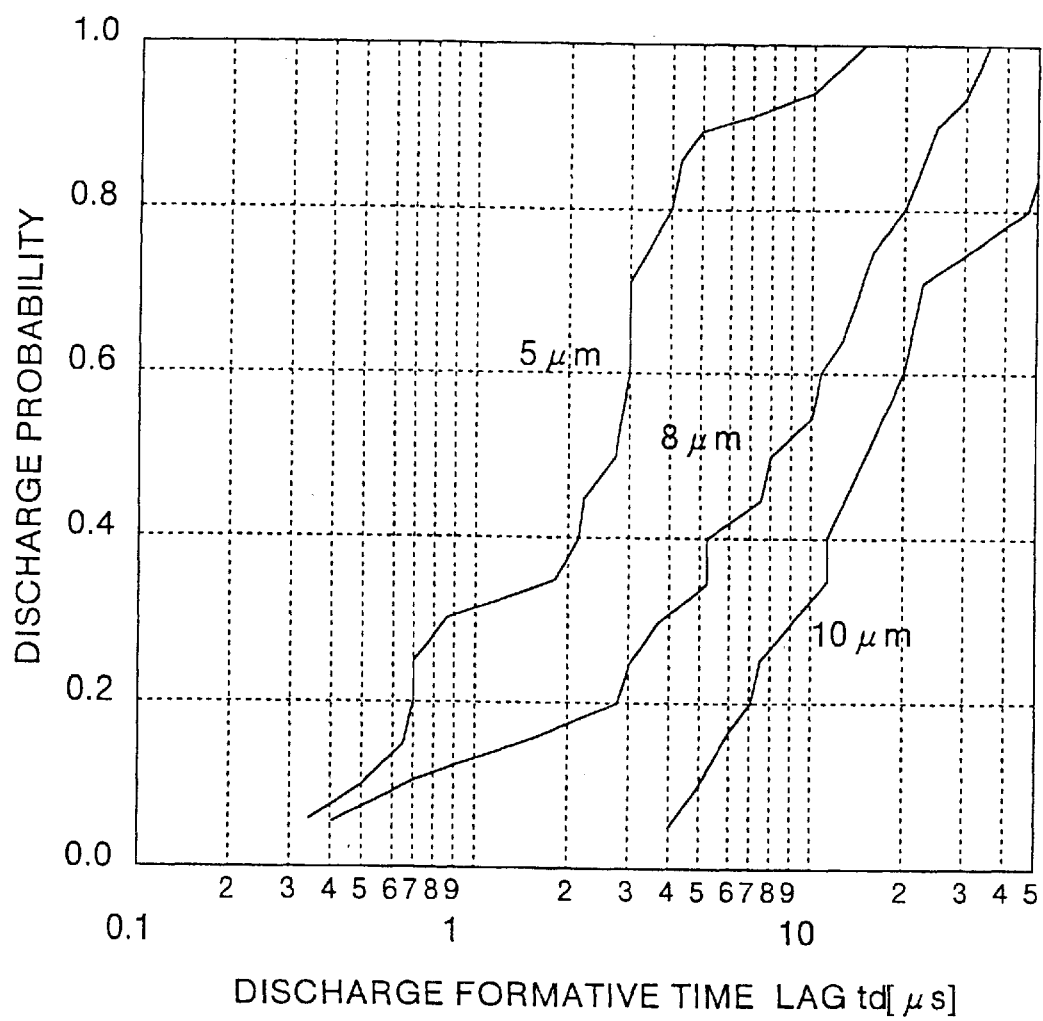
FIG. 8 is a graph showing a relation between a discharge formative time lag, a discharge probability and a gap interval in the first embodiment.

A discharge formative time lag td varies in the case of applying a voltage pulse having CR waveform generated by the first voltage applying circuit 3 to the interelectrode. The variation range of the discharge formative time lag td becomes narrow as compared with the case of applying a rectangular voltage pulse, and therefore, an average value of the discharge formative time lag td becomes short (see the line L1 shown in FIG. 7). Moreover, when a gap interval varies, and becomes small, a probability of generating a discharge lag becomes 100% before a voltage pulse rises up to a voltage value generating a concentrated discharge. FIG. 8 is a view showing a relation between a discharge formative time lag, a discharge probability and a gap interval in the first embodiment. In FIG. 8, there is shown each discharge formative time lag td when a gap interval is set to each of 5 $\mu$m, 8 $\mu$m and 10 $\mu$m. As shown in FIG. 8, the discharge formative time lag td varies regardless of the gap interval. The variation range of the gap interval becomes narrow as compared with the case of applying a rectangular voltage pulse. Moreover, a discharge is made at a high probability before the discharge time-out comes.

As described above, according to the first embodiment, the first voltage applying circuit 3 applies the following voltage pulse between the workpiece 1 and the wire 2 so as to generate a discharge between the workpiece 1 and the wire 2 when a distance between the workpiece 1 and the wire 2 is an average value in machining. The voltage pulse has a rise time tr longer than the discharge formative time lag when a rectangular voltage pulse is applied, and rises up to the same voltage value as the rectangular voltage pulse. By doing so, in accordance with a gap interval, the interelectrode voltage is increased to a dischargeable voltage value, and simultaneously, a normal discharge is started before the interelectrode voltage becomes a voltage value generating a concentrated discharge. Therefore, it is possible to reduce a generation of concentrated discharge, a breakdown of electrode and a discharge mistake, and thus, to perform high-speed machining.

Figure 9:
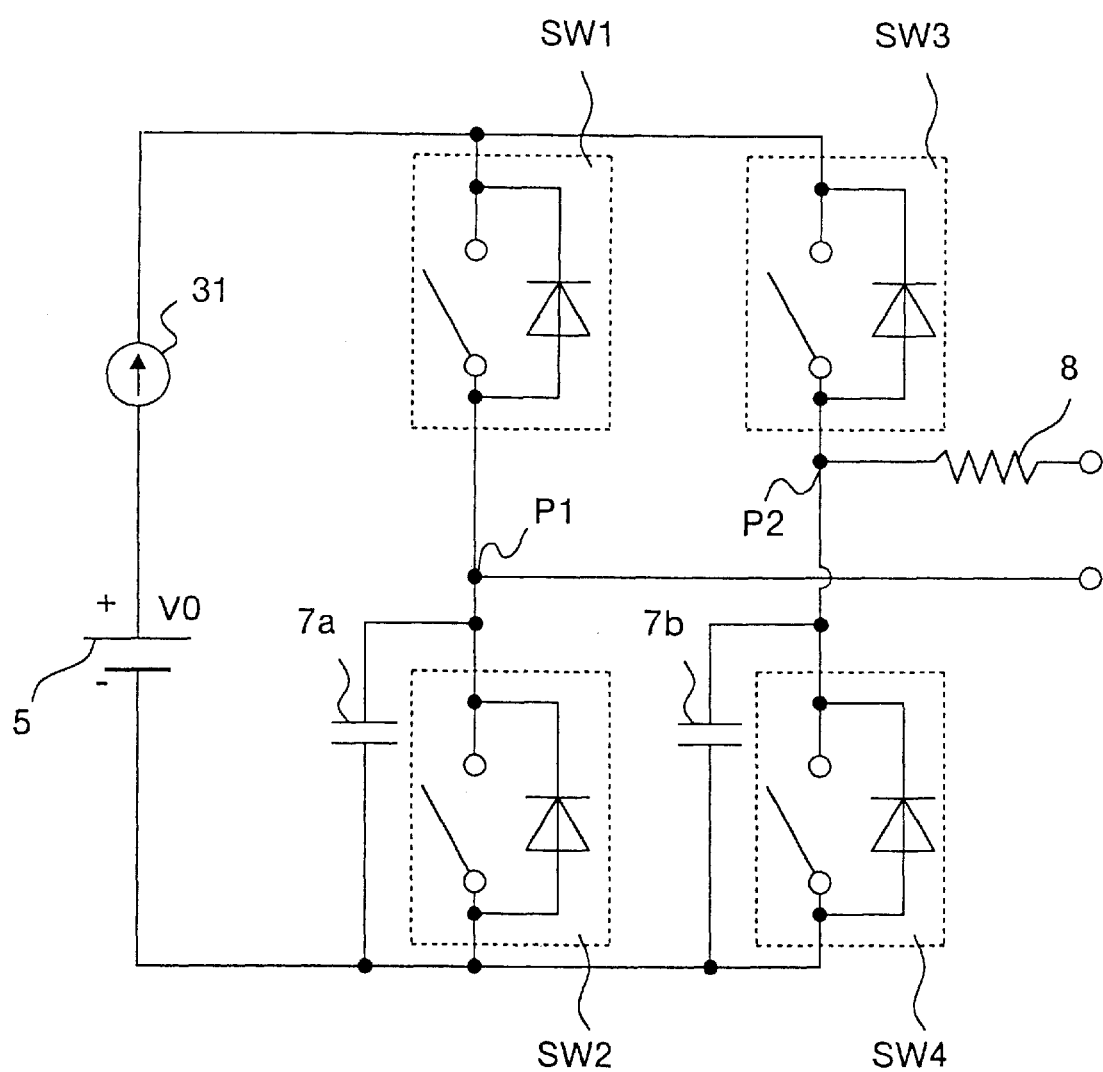
FIG. 9 a view schematically showing a configuration of a first voltage applying circuit according to a second embodiment.

According to this second embodiment of the present invention, the wire electric discharge machining apparatus is provided with the following another first voltage applying circuit in place of the first voltage applying circuit 3 generating a voltage pulse having a CR waveform in the above first embodiment. The first voltage applying circuit generates a voltage pulse having a ramp waveform such that a voltage value increases in proportional to an applied time. FIG. 9 is a view schematically showing a configuration of the first voltage applying circuit according to this second embodiment. In FIG. 9, identical reference numerals used in FIG. 2 are given to the same part as the first embodiment.

Figure 10:
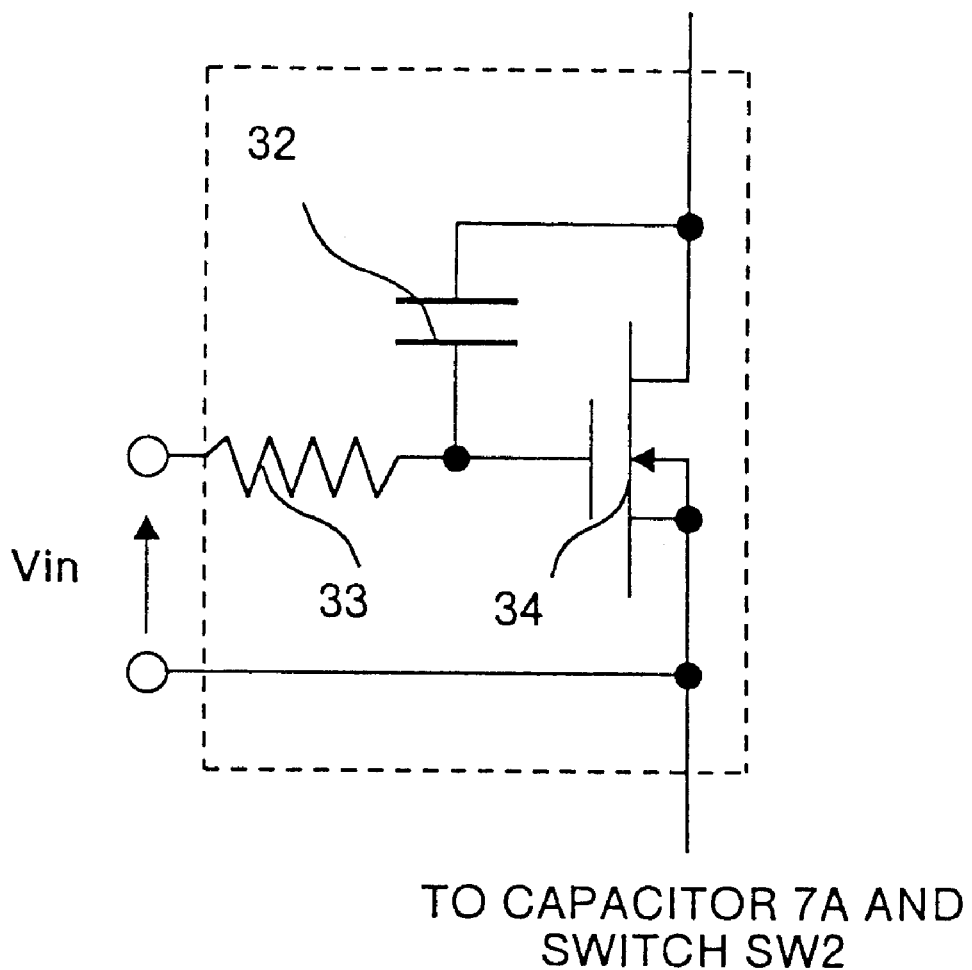
FIG. 10 is a view schematically showing a configuration of a direct current constant voltage source and a switch shown in FIG. 9.

The first voltage applying circuit is provided with a direct current constant current source 31, which outputs a predetermined current to the switches SW1 and SW3 side, in place of the resistor 6 included in the first voltage applying circuit 3 in the first embodiment. In the first voltage applying circuit, when the switches SW1 and SW4 are turned on, a positive voltage pulse is applied to the wire 2 side. Moreover, when the switches SW2 and SW3 are turned on, a negative voltage pulse is applied to the wire 2 side. In this case, in the actual circuit, the direct current constant current source 31 is not one, but tow direct current constant current sources are arranged. One of two is a direct current constant current source provided integrally with the switch SW1, and another is a direct current constant current source provided integrally with the switch SW2. FIG. 10 is a view schematically showing a configuration of the switch SW1 and the direct current constant current source.

The switch SW1 and the direct current constant current source include a FET 34, a capacitor 32 and a resistor 33. More specifically, the FET 34 has a drain terminal connected to a high voltage side of the direct current constant voltage source 5, and a source terminal connected to the capacitor 7a and switch SW2 side. The capacitor 32 is interposed between the drain terminal of the FET 34 and a gate terminal thereof, and the resistor 33 has one end connected to the gate terminal of the FET 34. A signal voltage Vin for controlling the direct current constant current source and the switch SW1 is applied between the other end of the resistor 33 and the source terminal of the FET 34. When the switch SW1 is turned on, a constant current flow into the capacitor 7a by the direct current constant current source. A voltage between both terminals of the capacitor 7a rises up in proportional to time until the voltage reaches V0 or the switch SW1 is turned off. Namely, when differentiating the voltage between both terminals of the capacitor 7a with respect to time, the obtained value is constant. Thus, by the above voltage, a positive voltage pulse is generated. The switch SW2 and the direct current constant current source has the same configuration as above.

Figure 11:
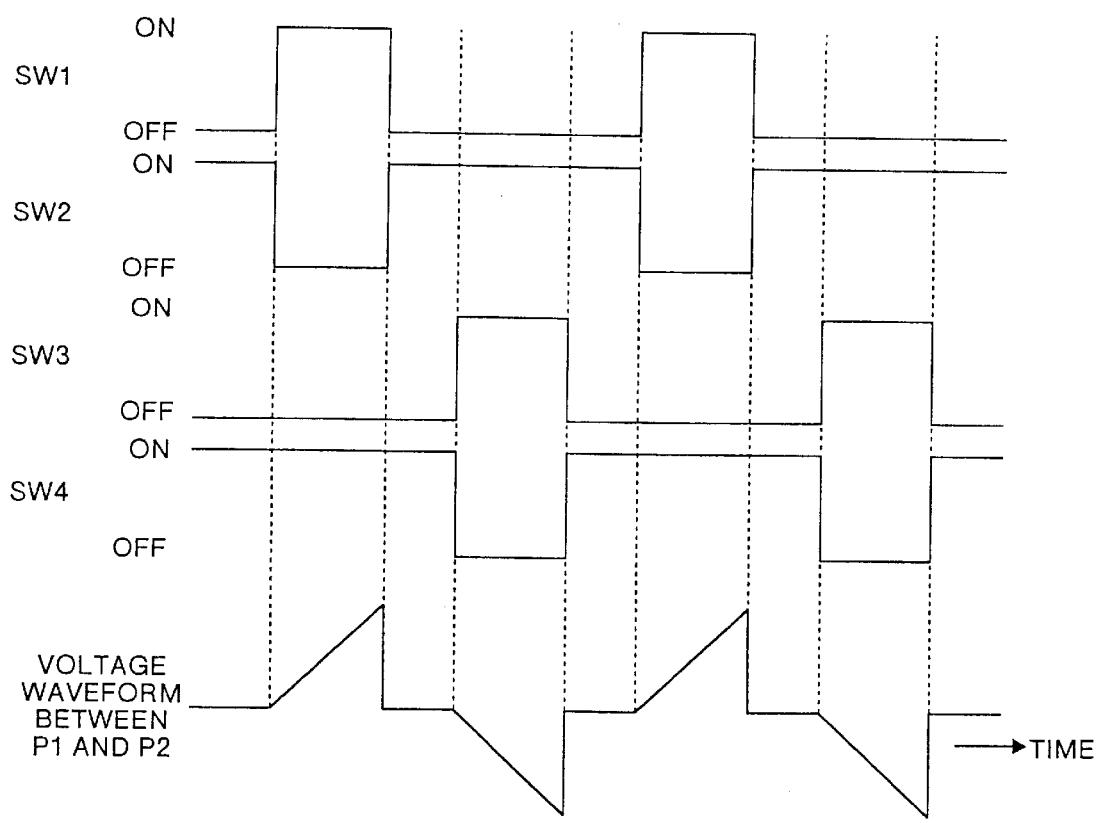
FIG. 11 is a timing chart showing an operation of the first voltage applying circuit according to the second embodiment.
Figure 12:
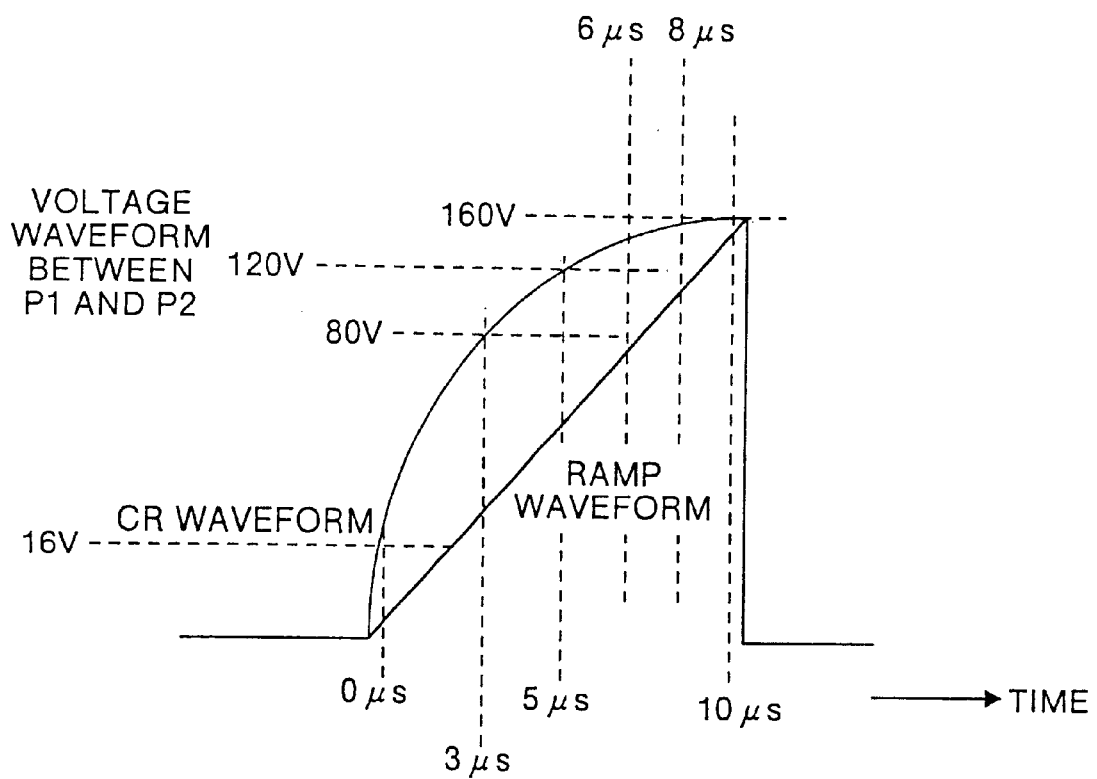
FIG. 12 is a view showing a voltage waveform of the first voltage applying circuit according to the second embodiment.
Figure 13:
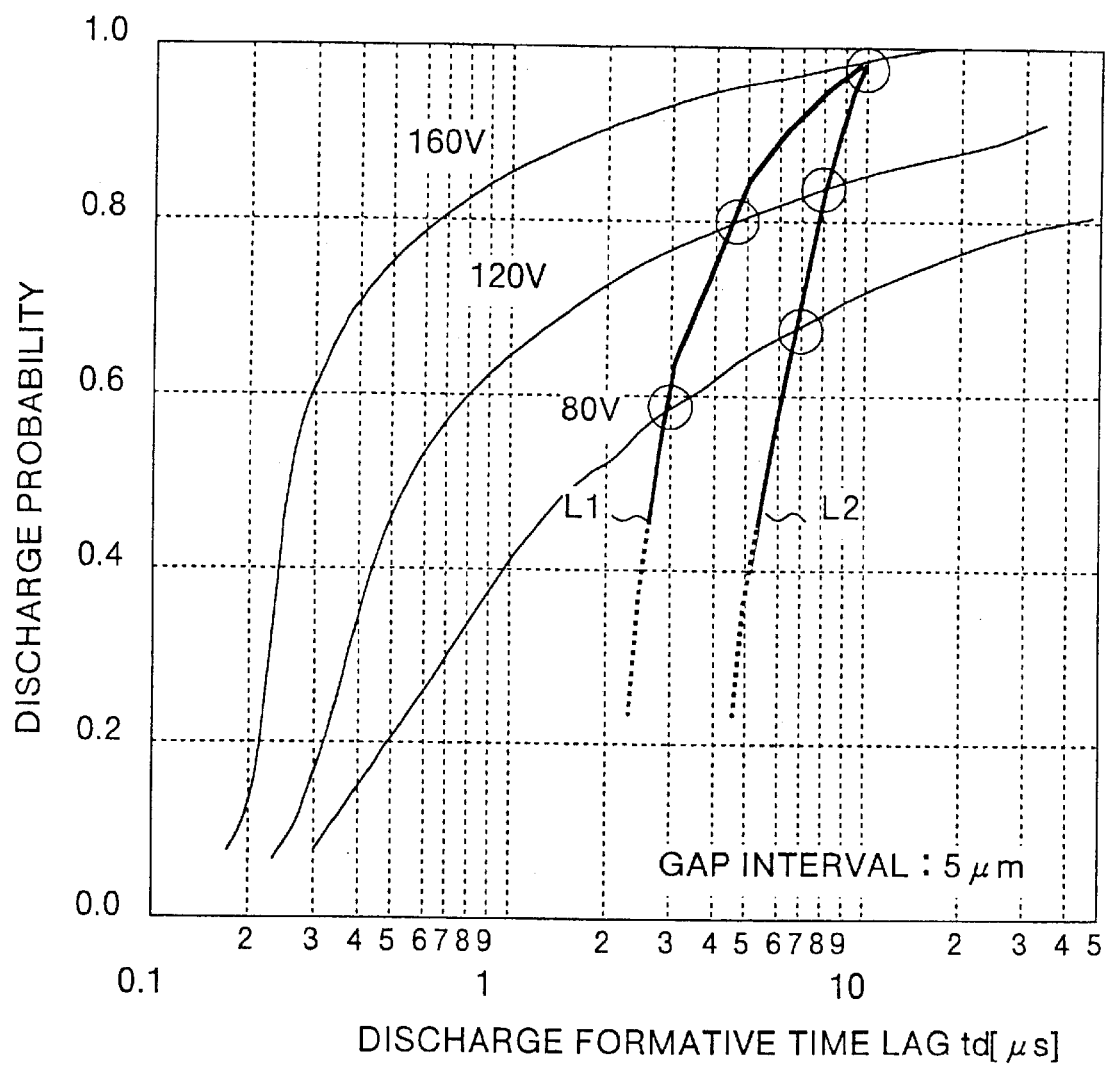
FIG. 13 is a graph showing a relation between a discharge formative time lag and a discharge probability in the second embodiment.

With the above construction, an operation of this second embodiment will be described below with reference to FIG. 11 to FIG. 13. FIG. 11 is a timing chart showing an operation of the first voltage applying circuit according to the second embodiment. The first voltage applying circuit of the second embodiment carries out the essentially same operation as the first voltage applying circuit 3 of the first embodiment. However, the first voltage applying circuit differs from the first voltage applying circuit 3 of the first embodiment in that it generates a voltage pulse having a ramp waveform in place of the voltage pulse having a CR wave form. FIG. 12 is a view showing a waveform of voltage pulse generated by the first voltage applying circuit according to this second embodiment.

The voltage pulse generated by the first voltage applying circuit has a ramp waveform linearly increasing a voltage value to the maximum value while keeping constant a time change rate of the voltage value. In the voltage pulse having a ramp waveform, the voltage value becomes low at the same point of time during voltage build-up as compared with the CR waveform voltage pulse having the same maximum value. Therefore, as shown in FIG. 13, a probability curved line L2 of discharge formative time lag in the case of applying the ramp waveform voltage pulse is situated on the right-hand side of a probability curved line L1 of discharge formative time lag in the case of applying the CR waveform voltage pulse. Namely, a probability becomes high such that the discharge formative time lag in the case of applying the ramp waveform voltage pulse becomes long as compared with the discharge formative time lag in the case of applying the CR waveform voltage pulse.

However, in this case, if the final maximum value is the same, the point of time when a discharge probability in the case of applying the ramp waveform voltage pulse becomes 100% approximately coincides with the point of time when a discharge probability in the case of applying the CR waveform voltage pulse becomes 100%. Therefore, a variation range of the discharge formative time lag in the case of applying the ramp waveform voltage pulse becomes narrow as compared with a variation range of the discharge formative time lag in the case of applying the CR waveform voltage pulse. In FIG. 12, there is shown a triangular waveform, which becomes 0V immediately when it reaches the maximum value. However, in this case, after the triangular waveform reaches the maximum value, the maximum value may be kept.

As described above, a desired waveform is selected as a voltage pulse, and thereby, it is possible to set the variation range of discharge formative time lag and an average value of the discharge formative time lag to a desired value. As described before, according to the second embodiment, the capacitors 7a and 7b generate positive and negative voltage pulse by a voltage between their both terminals, and the direct current constant current source 31 supplies a constant current to the capacitors 7a and 7b until the voltage between both terminals of these capacitors 7a and 7b becomes a predetermined value. By doing so, it is possible to generate a voltage pulse whose voltage value rises in proportional to a time applying a voltage; therefore, the variation range of the discharge formative time lag can be made narrow.

Figure 14:
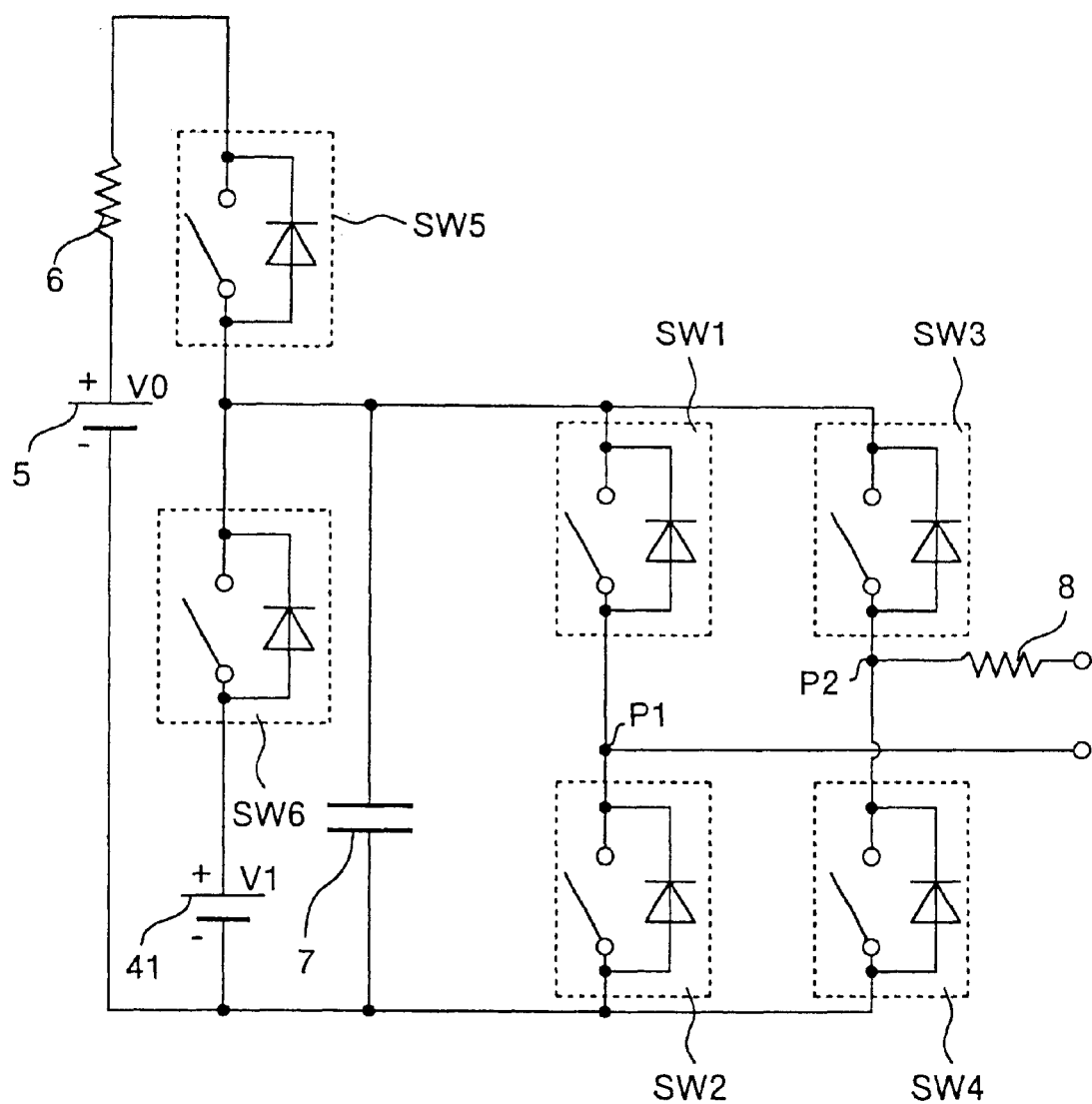
FIG. 14 a view schematically showing a configuration of a first voltage applying circuit according to a third embodiment.

According to this third embodiment of the present invention, the wire electric discharge machining apparatus is provided with the following another first voltage applying circuit in place of the first voltage applying circuit 3 generating a voltage pulse gently rising up from 0V to the maximum value in the above first embodiment. The first voltage applying circuit generates a voltage pulse, which rapidly rises up to a predetermined value, and thereafter, gently rises up to the maximum value. FIG. 14 is a view schematically showing a configuration of the first voltage applying circuit according to this third embodiment. In FIG. 14, identical reference numerals used in FIG. 2 are given to the same part as the first embodiment.

In the first voltage applying circuit, a switch SW5 is interposed between the switches SW1, SW3 and the resistor 6 of the first voltage applying circuit 3 of the first embodiment. Further, a series circuit comprising a direct current constant voltage source 41 and a switch SW6 is interposed between the switch SW1 and SW3 side of the switch SW5 and the low voltage side of the direct current constant voltage source 5. The direct current constant voltage source 41 generates a predetermined voltage V1. Furthermore, in place of the capacitors 7a and 7b, a capacitor 7 is interposed between the switch SW1 and SW3 side of the switch SW5 and the low voltage side of the direct current constant voltage source 5. The switches SW5 and SW6 have the same construction as the switch SW1 to the switch SW4. The direct current constant voltage source 41 has a low voltage side connected to the low voltage side of the direct current constant voltage source 5, and has a high voltage side connected to the switch SW6. In the first voltage applying circuit, when the switches SW1, SW4 and SW5 are turned on, a positive voltage pulse is applied to the wire 2 side.

Moreover, when the switches SW2, SW3 and SW5 are turned on, a negative voltage pulse is applied to the wire 2 side. In the first voltage applying circuit, before a voltage is applied to the interelectrode, the switch SW6 is closed, and a voltage between both terminals of the capacitor 7 is set to V1. When the switch SW5 is turned on while the switch SW6 being turned off, the voltage between both terminals of the capacitor 7 gently rises up to V0. By the voltage, positive and negative voltage pulse is generated. In other words, a voltage pulse having a two-stage rising voltage value is generated. After the voltage is applied to the interelectrode, when the switch SW5 is turned of while the switch SW6 being turned on, the voltage between both terminals of the capacitor 7 returns to V1.

The voltage V1 generated by the direct current constant voltage source 41 is set lower than the voltage V0. More specifically, the voltage V0 is set to a range from 60V to 300V; on the other hand, the voltage V1 is set to a range from 0V to 100V. In the electric discharge machining apparatus, an interelectrode voltage (arc voltage) is about 15V to 20V when a discharge occurs. Moreover, unless the minimum applied voltage of about 50V or more is applied to the interelectrode, no discharge occurs. The arc voltage and the minimum applied voltage are varied depending upon conditions such as electrode, gap interval, working fluid or the like.

To apply a voltage having no contribution for discharge formation is wasteful in time, and is a factor of reducing a machining speed. Preferably, the voltage V1 is set to the minimum applied voltage of about 50V or more. On the other hand, if the voltage V1 is too set higher, a probability of generating a concentrated discharge becomes high; therefore, the voltage V1 is set to 100V or less. The voltage V0 enables a discharge even if the gap interval varies and becomes wider, and is set to a range from 60V to 300V in order to reduce a concentrated discharge.

Figure 15:
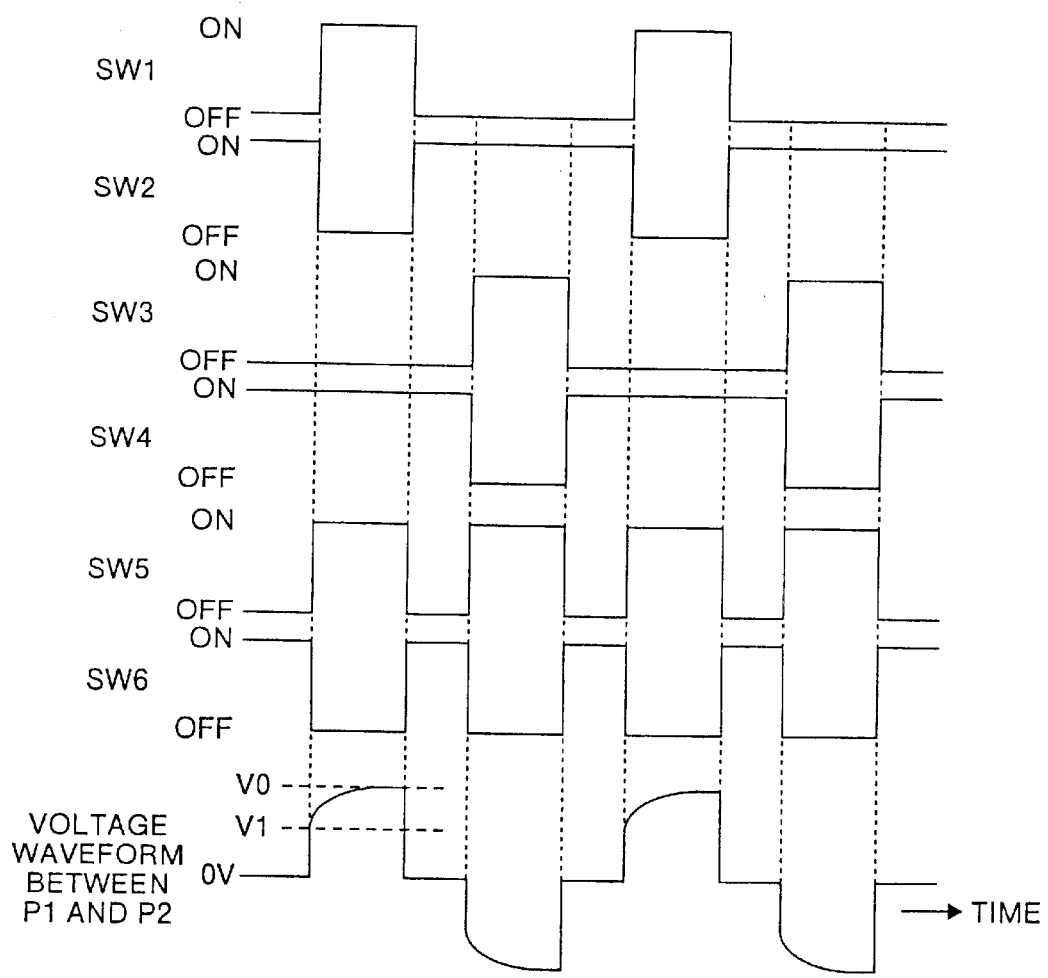
FIG. 15 is a timing chart showing an operation of the first voltage applying circuit according to the third embodiment.

With the above construction, an operation of the third embodiment will be described below with reference to FIG. 15 to FIG. 17. FIG. 15 is a timing chart showing an operation of the first voltage applying circuit according to the third embodiment. The first voltage applying circuit of the third embodiment carries out the essentially same operation as the first voltage applying circuit 3 of the first embodiment. The first voltage applying circuit of the third embodiment is different from the first voltage applying circuit 3 of the first embodiment in that it generates a two-stage rising voltage pulse, which rapidly rises up to the voltage V1, and thereafter, gently rises up to the voltage V0, in place of the voltage pulse rising gently from 0V. Moreover, when the switches SW1 and SW3 are in an off state, the switch SW5 becomes an off state; on the other hand, the switch SW6 becomes an on state. When the switch SW1 or SW3 is turned on, the switch SW5 is turned on, and the switch SW6 is turned off.

Figure 16:
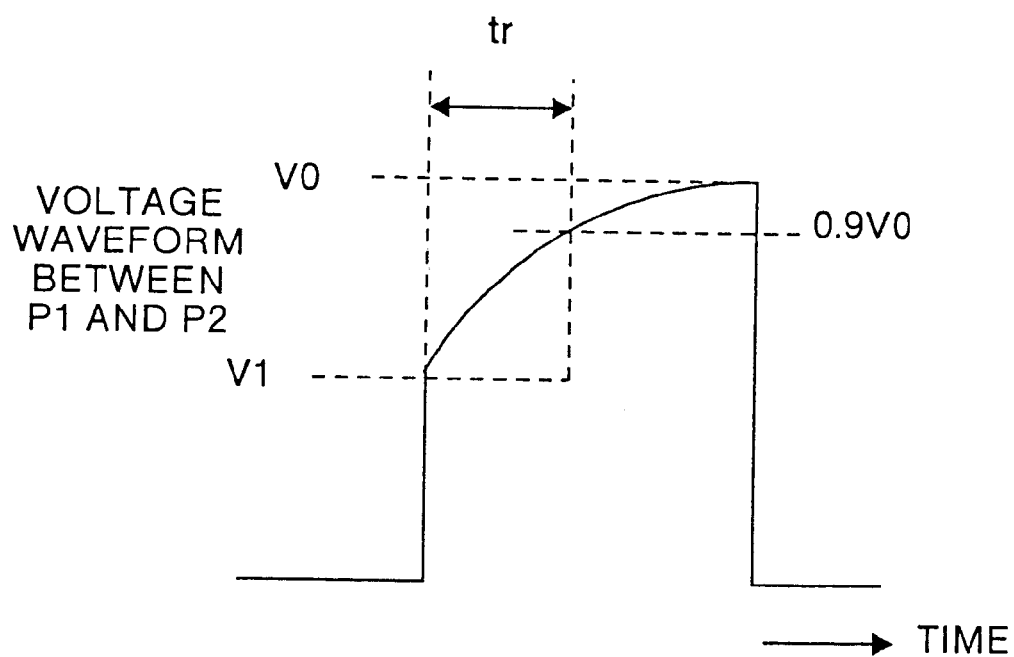
FIG. 16 is a view showing a voltage waveform of the first voltage applying circuit according to the third embodiment.
Figure 17:
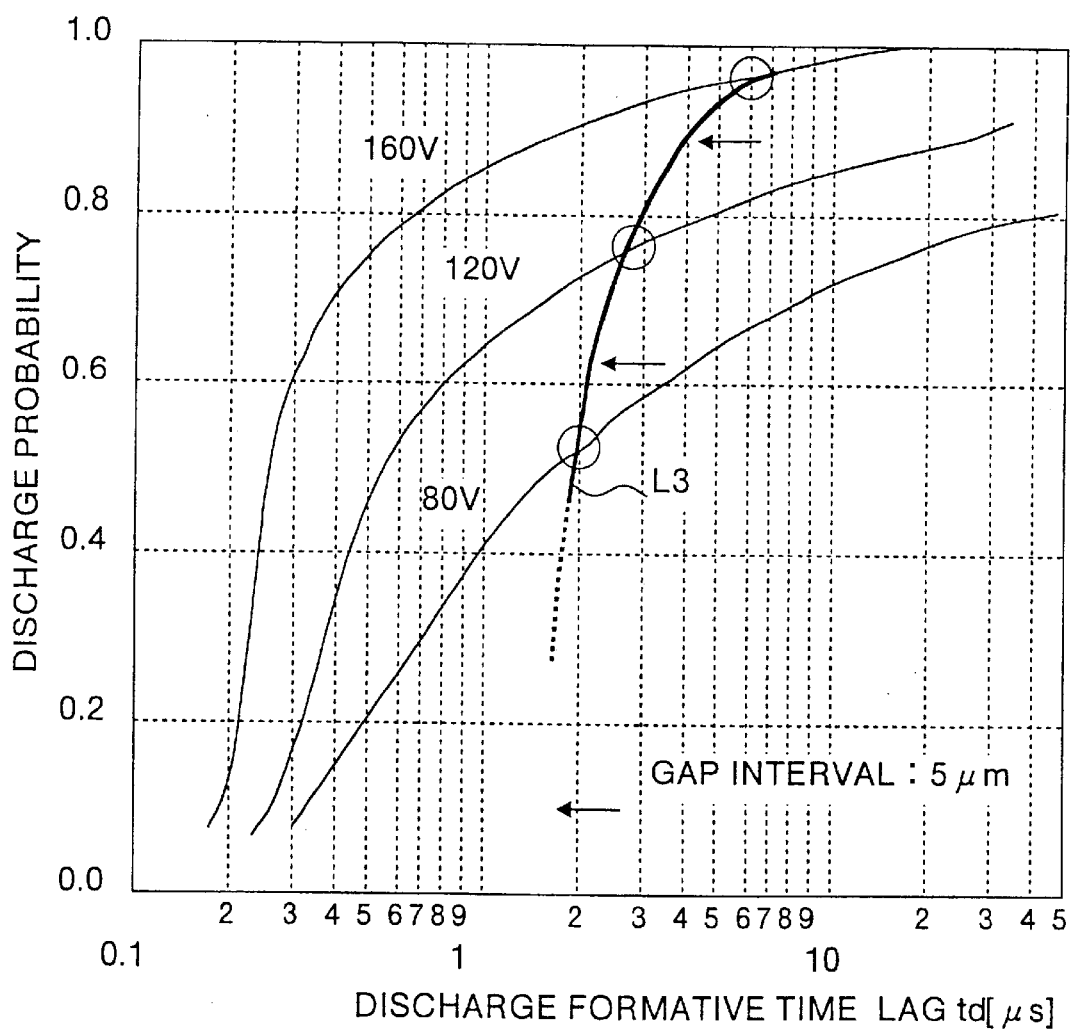
FIG. 17 is a graph showing a relation between a discharge formative time lag and a discharge probability in the third embodiment.

FIG. 16 is a view showing a waveform of the voltage pulse generated by the first voltage applying circuit according to the third embodiment. The voltage pulse generated by the first voltage applying circuit can save time for increasing a voltage to the V1 as compared with the voltage pulse of the first embodiment shown in FIG. 6. Thus, as shown in FIG. 17, a probability curved line L3 of discharge formative time lag in the case of using the voltage pulse of the third embodiment, is situated on a left-hand side from the probability curved line L1 of discharge formative time lag in the case of using the voltage pulse of the first embodiment. Namely, a probability becomes high such that discharge formative time lag in the case of using the voltage pulse of the third embodiment becomes shorter than the discharge formative time lag in the case of using the voltage pulse of the first embodiment.

As described above, according to the third embodiment, the direct current constant voltage source 41 generates the voltage V1 so that a voltage pulse rises up to the voltage V1. On the other hand, the direct current constant voltage source 5 generates the voltage V0 higher than the voltage V1 so that a voltage pulse gently rises from the voltage V1 to the voltage V0. By doing so, first, the voltage pulse rapidly rises up to the voltage V1, and thereafter, gently rises up to the voltage V0; therefore, it is possible to shorten a discharge formative time lag.

Figure 18:
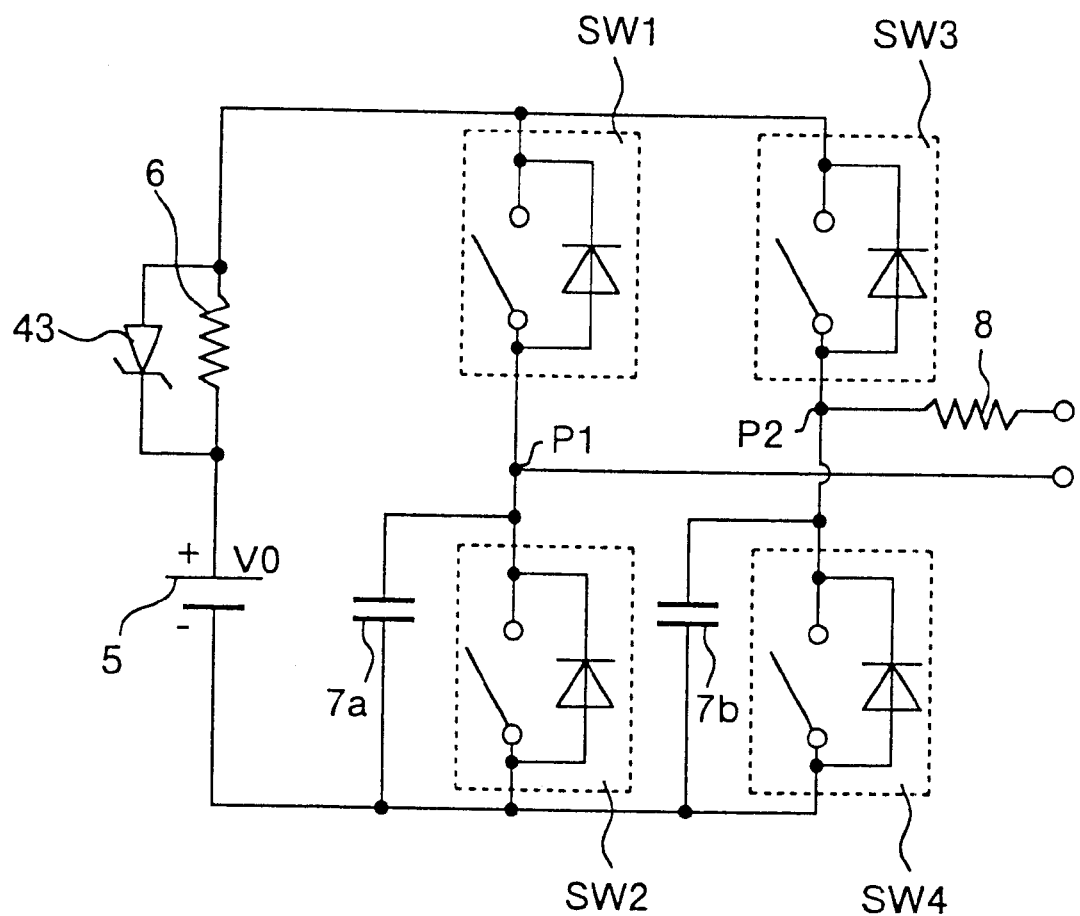
FIG. 18 a view schematically showing a configuration of a first voltage applying circuit according to a fourth embodiment.

In the aforesaid third embodiment, a two-stage voltage pulse is generated by two direct current constant voltage sources. According to this fourth embodiment, one direct current constant voltage source generates the same voltage pulse as the third embodiment. FIG. 18 is a view schematically showing a configuration of a first voltage applying circuit according to the fourth embodiment. In FIG. 18, identical reference numerals used in FIG. 2 are given to the same parts as the first embodiment.

The first voltage applying circuit is provided with a Zener diode 43 in parallel with the resistor 6 of the first voltage applying circuit 3 of the first embodiment. The Zener diode 43 becomes an on state by a Zener effect when a voltage between its both terminals is (V0–V1) or more. When the switch SW1 or SW3 is turned on, a voltage of (V0–V1) or more is applied to both terminals of the Zener diode 43, and thereby, the Zener diode 43 becomes an on state. In this manner, a voltage pulse rapidly rises up to the voltage V1.

Figure 19:
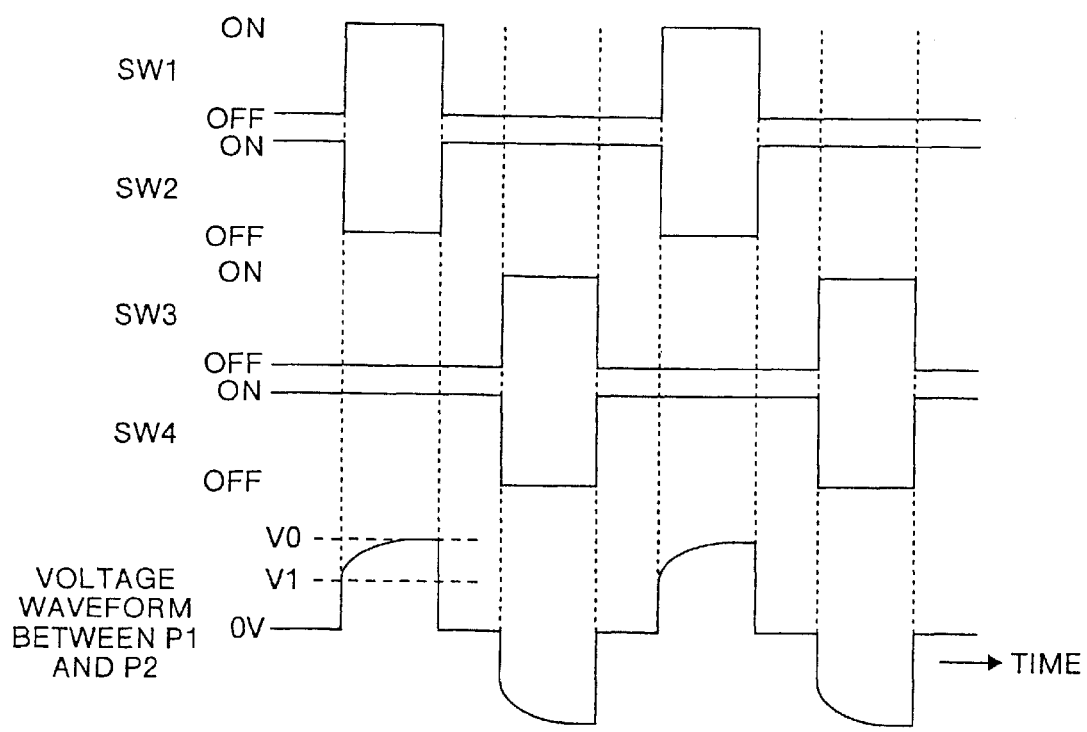
FIG. 19 is a timing chart showing an operation of the first voltage applying circuit according to the fourth embodiment.

When the voltage pulse exceeds the voltage V1, the Zener diode 43 does not become an on state, and therefore, a voltage gently rises up according to a resistance value of the resistor 6 and a CR waveform of time constant determined by a capacitance of the capacitors 7a and 7b. Thus, the first voltage applying circuit generates the same voltage pulse as the third embodiment, as shown in FIG. 19. As described before, according to the fourth embodiment, by a simple circuit using one direct current constant voltage source 5, it is possible to generate the two-stage voltage pulse same as the third embodiment.

Figure 20:
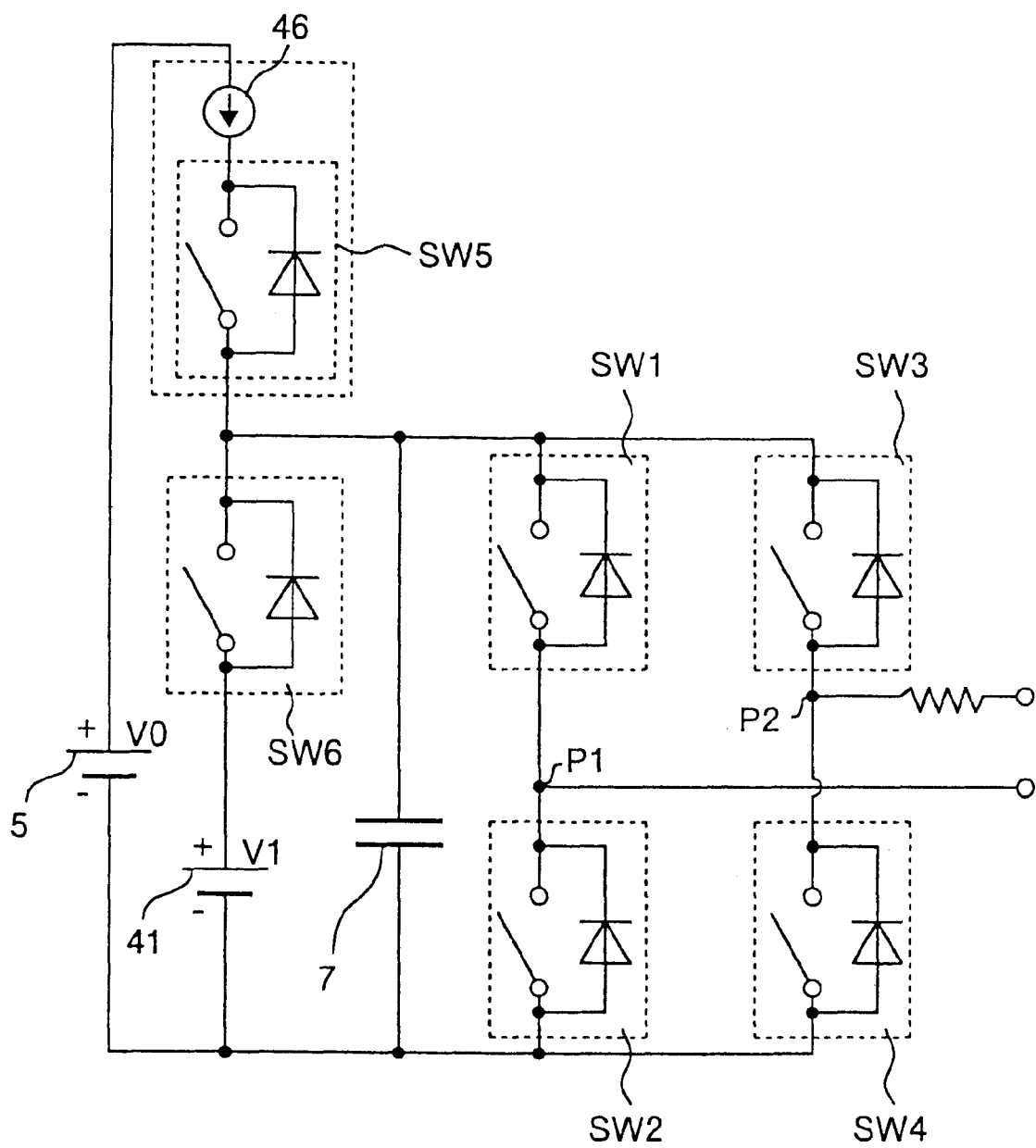
FIG. 20 a view schematically showing a configuration of a first voltage applying circuit according to a fifth embodiment.

According to the fifth embodiment of the present invention, the electric discharge machining apparatus is provided with the following first voltage applying circuit, in place of the first voltage applying circuit of the third embodiment, which generates a voltage pulse rapidly rising up to the voltage V1 and rising up to the voltage V0 according to a CR waveform. The first voltage applying circuit generates a voltage pulse, which rapidly rises up to the voltage V1, and thereafter, rises up to the voltage V0 according to a ramp waveform. FIG. 20 is a view schematically showing a configuration of the first voltage applying circuit according to the fifth embodiment of the present invention. In FIG. 20, identical reference numerals used in FIG. 14 are given to the same parts as the first embodiment.

The first voltage applying circuit is provided with a direct current constant current source 46 which outputs a predetermined current to the switch SW5 side, in place of the resistor 6 of the first voltage applying circuit of the third embodiment. The switch SW5 and the direct current constant current source 46 have the same construction as the switch SW1 and the direct current constant current source of the second embodiment shown in FIG. 10. In the first voltage applying circuit, when the switches SW1, SW4 and SW5 are turned on, a positive voltage pulse is applied to the wire 2 side. Moreover, when the switches SW2, SW3 and SW5 are turned on, a negative voltage pulse is applied to the wire 2 side. In the first voltage applying circuit, before a voltage is applied to the interelectrode, the switch SW6 is closed so that a voltage between both terminals of the capacitor 7 is set to V1.

Then, when the switch SW5 is turned on while the switch SW6 being turned off, a constant current flows into the capacitor 7 by the direct current constant current source 46, and thereby, the voltage between both terminals of the capacitor 7 rises up in proportional to time. By the voltage between both terminals of the capacitor 7, positive and negative voltage pulse is generated. Namely, a two-stage rising voltage pulse is generated. After the voltage is applied to the interelectrode, the switch SW5 is turned off while the switch SW6 being turned on, and thus, the voltage between both terminals of the capacitor 7 returns to the voltage V1.

Figure 21:
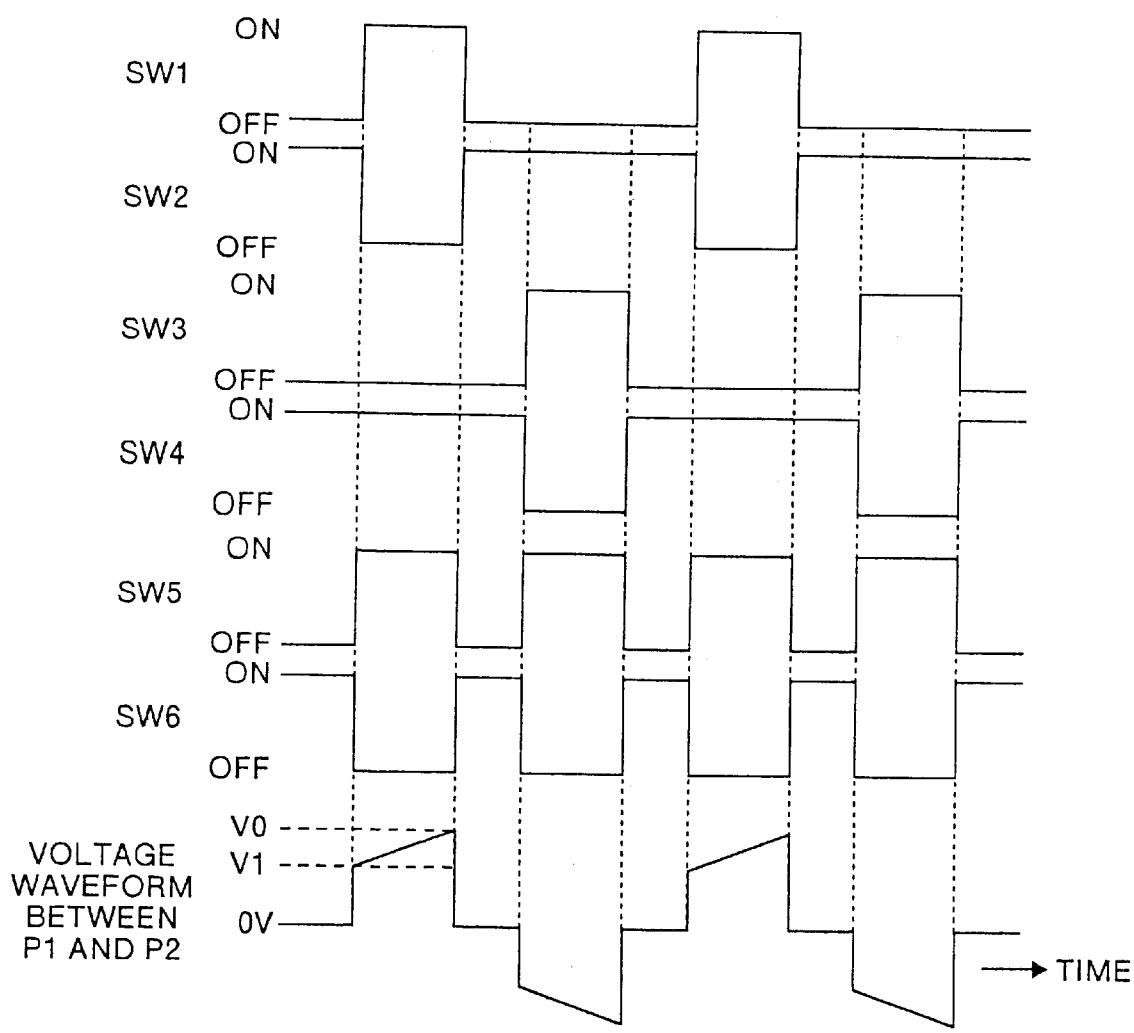
FIG. 21 is a timing chart showing an operation of the first voltage applying circuit according to the fifth embodiment.
Figure 22:
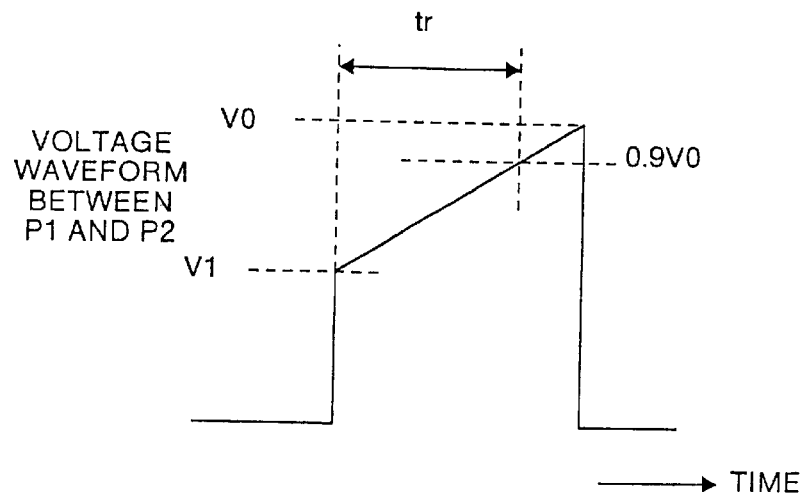
FIG. 22 is a view showing a voltage waveform of the first voltage applying circuit according to the fifth embodiment.

With the above construction, an operation of the fifth embodiment will be described below with reference to FIG. 21 and FIG. 22. FIG. 21 is a timing chart showing an operation of the first voltage applying circuit according to the fifth embodiment. The first voltage applying circuit of the fifth embodiment carries out the essentially same operation as the first voltage applying circuit of the third embodiment. The first voltage applying circuit of the fifth embodiment is different from the first voltage applying circuit of the third embodiment in that it generates a voltage pulse, which rises up to the voltage V1, and thereafter, rises up to the voltage V0 according to a ramp waveform as shown in FIG. 22, and not a CR waveform. As described before, according to the fifth embodiment, it is possible to form a waveform of voltage pulse rising from the voltage V1 to the voltage V0 into a ramp waveform.

In the above first to fifth embodiments, the wire electric discharge machine has been cited as an example. The first and second voltage applying circuits of the above first to fifth embodiments is applicable to a die sinking electric discharge machine. In this case, the same effect as above can be obtained.

As is evident from the above description, according to one aspect of this invention, in the electric discharge machining apparatus, a voltage applying unit applies a voltage pulse between a workpiece and an electrode so as to generate an electric discharge between the workpiece and the electrode. The voltage pulse has a rise time longer than a discharge formative time lag when a rectangular voltage pulse is applied when a distance between the workpiece and the electrode is an average value in machining, and rises up to the same voltage value as the rectangular voltage pulse. By doing so, in accordance with a gap interval, an interelectrode voltage is increased to a dischargeable voltage value, while a normal discharge is started before the interelectrode voltage becomes a voltage value generating a concentrated discharge. Therefore, it is possible to reduce a concentrated discharge, a breakdown of electrode and a discharge mistake, and thus, to perform high-speed machining.

Further, according to another aspect of this invention, in the electric discharge machining apparatus, a voltage applying unit applies a voltage pulse between a workpiece and an electrode so as to generate a second electric discharge between the workpiece and the electrode. The voltage pulse has a rise time longer than a discharge formative time lag when a rectangular voltage pulse is applied when a distance between the workpiece and the electrode is an average value in machining, and rises up to the same voltage value as the rectangular voltage pulse. By doing so, in accordance with a gap interval, an interelectrode voltage is increased to a dischargeable voltage value, while a normal discharge is started before the interelectrode voltage becomes a voltage value generating a concentrated discharge. Therefore, it is possible to reduce a concentrated discharge, a breakdown of electrode and a discharge mistake, and thus, to perform high-speed machining.

Further, the rise time of the voltage pulse is set to 0.1 $\mu$s or more and 100 $\mu$s or less. By doing so, in accordance with a gap interval, an interelectrode voltage is increased to a dischargeable voltage value, while a normal discharge is started before the interelectrode voltage becomes a voltage value generating a concentrated discharge. Therefore, it is possible to reduce a concentrated discharge, a breakdown of electrode and a discharge mistake, and thus, to perform high-speed machining.

Further, a direct current constant voltage source generates a predetermined voltage, and a capacitor-resistor circuit gets dull a rise of voltage generated by the direct current constant voltage source so as to generate the voltage pulse. Therefore, it is possible to generate a voltage pulse by a simple circuit.

Further, a capacitor generates the voltage pulse by a voltage between both terminals of the capacitor, and a direct current constant current source supplies a current to the capacitor until the voltage between both terminals of the capacitor becomes a predetermined value. By doing so, a voltage pulse having a voltage value rising up in proportional to an applied time is generated; therefore, it is possible to make narrow a range where a discharge formative time lag varies.

Further, a first direct current constant voltage source generates a first predetermined voltage and raises the voltage pulse to the first voltage, and a second direct current voltage source generates a second voltage higher than the first voltage and raises the voltage pulse from the first voltage to the second voltage. By doing so, the voltage pulse rapidly rises up to the first voltage, and thereafter, the voltage pulse rises up to the second voltage. Therefore, it is possible to shorten a discharge formative time lag.

Further, a capacitor-resistor circuit gets dull the voltage pulse rising from the first voltage to the second voltage. Therefore, it is possible to generate a voltage pulse by a simple circuit.

Further, a capacitor generates the voltage pulse by a voltage between both terminals of the capacitor, and a first direct current constant voltage source sets the voltage between both terminals of the capacitor to a predetermined first voltage before the voltage pulse application is started. Further, a direct current constant current source supplies a current to the capacitor until the voltage between both terminals of the capacitor becomes a second voltage higher than the first voltage after the voltage pulse application is started. By doing so, first, the voltage pulse rapidly rises up to the first voltage, and thereafter, the voltage pulse rises up to the second voltage in proportional to an applied time. Therefore, it is possible to shorten a discharge formative time lag, and to make narrow a range where a discharge formative time lag varies.

Further, the first voltage is set to 0V or more and 100V or less, and the second voltage is set to 60V or more and 300V or less. By doing so, in accordance with a gap interval, an interelectrode voltage is increased to a dischargeable voltage value, while a normal discharge is started before the interelectrode voltage becomes a voltage value generating a concentrated discharge. Therefore, it is possible to reduce a concentrated discharge, a breakdown of electrode and a discharge mistake, and thus, to perform high-speed machining.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An electric discharge machining apparatus comprising:
   an electrode for generating an electric discharge to a workpiece, thereby machining the workpiece; and
   a voltage applying unit which applies a voltage pulse between the electrode and the workpiece, wherein the voltage pulse has a rise time longer than a time lag of forming a discharge between the electrode and the workpiece when a rectangular voltage pulse is applied between the electrode and the workpiece, distance between the workpiece and the electrode is an average distance in discharge machining, and the voltage pulse rises to the same voltage as the rectangular voltage pulse, wherein the voltage applying unit includes
      a first direct current constant voltage source which generates a first voltage, and raises the voltage pulse to he first voltage,
      a second direct current voltage source which generates a second voltage, higher than the first voltage, and raises the voltage pulse from the first voltage to the second voltage, and
      a capacitor-resistor for slowing rise of the voltage pulse from the first voltage to the second voltage.

2. The electric discharge machining apparatus according to claim 1, wherein the rise time of the voltage pulse is at least 0.1 micro seconds and no more than 100 micro seconds.

3. The electric discharge machining apparatus according to claim 1, wherein the first voltage is at least 0V and does not exceed 100V, and the second voltage is at least 60V and does not exceed 300V.

4. An electric discharge machining apparatus comprising:
   an electrode for generating an electric discharge to a workpiece, thereby machining the workpiece; and
   a voltage applying unit which applies a voltage pulse between the electrode and the workpiece, wherein the voltage pulse has a rise time longer than a time lag of forming a discharge between the electrode and the workpiece when a rectangular voltage pulse is applied between the electrode and the workpiece, distance between the workpiece and the electrode is an average distance in discharge machining, and the voltage pulse rises to the same voltage as the rectangular voltage pulse, wherein the voltage applying unit includes
      a capacitor which generates the voltage pulse from a voltage across the capacitor,
      a first direct current constant voltage source for setting the voltage across the capacitor to a first voltage before applying of the voltage pulse, and
      a direct current constant current source for supplying a current to the capacitor until the voltage across the capacitor becomes a second voltage, higher than the first voltage, after the applying of the voltage pulse.

5. The electric discharge machining apparatus according to claim 4, wherein the first voltage is at least 0V and does not exceed 100V, and the second voltage is at least 60V and does not exceed 300V.

6. An electric discharge machining apparatus comprising:
   an electrode for generating an electric discharge to a workpiece, thereby machining the workpiece;
   a first voltage applying unit which applies a first voltage pulse between the electrode and the workpiece and generates a first electric discharge with a first electric current; and
   a second voltage applying unit which applies a second voltage pulse between the electrode and the workpiece and generates a second electric discharge with a second electric current upon detection of the first electric discharge, the second electric current being larger than the first electric current, wherein the first voltage pulse has a rounded rising waveform produced by a resistor and reactive element circuit in the first voltage applying unit and a rise time longer than a time lag in forming a discharge between the electrode and the workpiece when a rectangular voltage pulse is applied across the electrode and the workpiece, distance between the workpiece and the electrode is an average distance in electric discharge machining, and the first voltage pulse rises to the same voltage as the rectangular voltage pulse to generate the first electric discharge.

7. The electrode machining apparatus according to claim 6, including:
   a first control circuit for controlling the first voltage applying unit in applying the first voltage pulse between the electrode and the workpiece;
   a second control circuit for controlling the second voltage applying unit in applying the second voltage pulse between the electrode and the workpiece; and
   a discharge detecting circuit connected across the electrode and the workpiece for detecting initiation of the first electric discharge and operatively connected to the first control circuit and the second control circuit so the first control circuit terminates application of the first voltage pulse and the second control circuit initiates application of the second voltage pulse upon detection of the first discharge.

8. The electric discharge machining apparatus according to claim 6, wherein the rise time of the first voltage pulse is at least 0.1 micro seconds and no more than 100 micro seconds.

9. The electric discharge machining apparatus according to claim 6, wherein the first voltage applying unit includes a direct current constant voltage source which generates a voltage, and the resistor and reactive element circuit comprises a capacitor-resistor circuit for controlling rising of a voltage generated by the direct current constant voltage source in generating the first voltage pulse.

10. The electric discharge machining apparatus according to claim 6, wherein the first voltage applying unit includes,
    a first direct current constant voltage source which generates a first voltage, and raises a voltage pulse to the first voltage; and
    a second direct current voltage source which generates a second voltage, higher than the first voltage, and raises the voltage pulse from the first voltage to the second voltage.

11. The electric discharge machining apparatus according to claim 10, wherein the resistor and reactive element circuit includes a capacitor-resistor circuit for controlling rising of the voltage pulse from the first voltage to the second voltage.

12. The electric discharge machining apparatus according to claim 10, wherein the first voltage is at least 0V and does not exceed 100V, and the second voltage is at least 60V and does not exceed 300V.

13. The electric discharge machining apparatus according to claim 6, wherein the first voltage applying unit includes:
    a capacitor which generates a voltage pulse from a voltage across the capacitor;
    a direct current constant voltage source for setting the voltage across the capacitor to a first voltage before application of the voltage pulse; and
    a direct current constant current source for supplying a current to the capacitor until the voltage across the capacitor becomes a second voltage, higher than the first voltage, after the application of the voltage pulse.

14. An electric discharge machining apparatus comprising:

an electrode for generating an electric discharge to a workpiece, thereby machining the workpiece;

a voltage applying unit which applies a first voltage pulse between the electrode and the workpiece and generates a first electric discharge between the electrode and the workpiece and has a first electric current, and applies a second voltage pulse between the electrode and the workpiece and generates a second electric discharge with a second electric current larger than the first electric current, wherein the first voltage pulse has a rounded waveform produced by a resistor and reactive element circuit of the voltage applying unit and a rise time longer than a time lag for forming a discharge when a rectangular voltage pulse is applied between the electrode and the workpiece, distance between the workpiece and the electrode is an average distance in electric discharge machining, and the first voltage pulse rises to the same voltage as the rectangular voltage pulse when generating the first electric discharge.

15. The electric discharge machining apparatus according to claim 14, wherein the rise time of the first voltage pulse is at least 0.1 micro seconds and no more than 100 micro seconds.

16. An electric discharge machining apparatus comprising:

an electrode for generating an electric discharge to a workpiece, thereby machining the workpiece;

a first voltage applying unit including a first power source and a second power source and generating a first voltage pulse, wherein the first voltage applying unit applies the first voltage pulse between the electrode and the workpiece for generating a first electric discharge with a first electric current;

a second voltage applying unit including a third power source and generating a second voltage pulse, wherein the second voltage applying unit applies the second voltage pulse between the electrode and the workpiece for generating a second electric discharge with a second electric current, upon detection of the first electric discharge, and the first power source generates a first power source voltage, the second power source generates a second power source voltage higher than the first power source voltage, and the first voltage pulse has a rounded rising waveform abruptly rising to the same absolute value as the first power source voltage, and, thereafter, gradually rising to a peak value having the same absolute value as of the second power source voltage, within a rise time forming a discharge between the electrode and the workpiece.

17. An electric discharge machining apparatus comprising:

an electrode for generating an electric discharge to a workpiece, thereby machining the workpiece;

a first voltage applying unit including a first power source and a second power source and generating a first voltage pulse, wherein the first voltage applying unit applies the first voltage pulse between the electrode and the workpiece for generating a first electric discharge with a first electric current;

a second voltage applying unit including a third power source and generating a second voltage pulse, wherein the second voltage applying unit applies the second voltage pulse between the electrode and the workpiece for generating a second electric discharge with a second electric current, upon detection of the first electric discharge, and the first power source generates a first power source voltage, the second power source generates a second power source voltage higher than the first power source voltage, and the first voltage pulse has a waveform abruptly rising to the same absolute value as the first power source voltage, and, thereafter, linearly rising to a peak value having the same absolute value is the second power source voltage, within a rise time forming a discharge between the electrode and the workpiece.

* * * * *